(12) United States Patent
Yao et al.

(10) Patent No.: US 10,917,806 B2
(45) Date of Patent: *Feb. 9, 2021

(54) MEASUREMENT JOB CREATION AND PERFORMANCE DATA REPORTING FOR ADVANCED NETWORKS INCLUDING NETWORK SLICING

(71) Applicant: INTEL CORPORATION, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,939

(22) Filed: May 8, 2019

(65) Prior Publication Data

US 2019/0281486 A1 Sep. 12, 2019

Related U.S. Application Data

(63) Continuation of application No. 16/247,050, filed on Jan. 14, 2019.

(60) Provisional application No. 62/618,977, filed on Jan. 18, 2018.

(51) Int. Cl.
*H04W 4/00* (2018.01)
*H04W 24/10* (2009.01)
*H04W 16/02* (2009.01)
*H04W 84/04* (2009.01)

(52) U.S. Cl.
CPC .......... *H04W 24/10* (2013.01); *H04W 16/02* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2011/0271293 A1 | 11/2011 | Huegel | |
| 2011/0314145 A1* | 12/2011 | Raleigh | H04L 47/19 709/224 |
| 2012/0137059 A1* | 5/2012 | Yang | G06F 3/068 711/104 |
| 2013/0282994 A1* | 10/2013 | Wires | G06F 9/45558 711/158 |
| 2016/0373474 A1* | 12/2016 | Sood | G06F 21/53 |
| 2018/0077080 A1* | 3/2018 | Gazier | H04L 47/803 |
| 2018/0098251 A1 | 4/2018 | Li et al. | |

(Continued)

OTHER PUBLICATIONS

3GPP TS 23.501, "3rd Generation Partnership Project; Technical Specification Group Services and System Aspects; System Architecture for the 5G System; Stage 2 (Release 15)", V15.0.0, Dec. 2017, 181 pages.

(Continued)

*Primary Examiner* — Elisabeth Benoit Magloire
(74) *Attorney, Agent, or Firm* — Alliance IP, LLC

(57) ABSTRACT

Various embodiments herein define a performance data and measurement job creation solutions for advanced networks including network slicing, based on a service-based framework. The embodiments allow different kinds of consumers to flexibly use performance management services and performance data services, to collect real-time performance data and/or periodical performance data.

21 Claims, 15 Drawing Sheets

(56) References Cited

U.S. PATENT DOCUMENTS

2018/0132117 A1* 5/2018 Senarath ............. G06F 11/3006
2018/0316543 A1 11/2018 Hwang
2019/0089780 A1 3/2019 Yousaf et al.
2019/0253912 A1* 8/2019 Yao ....................... H04W 24/10
2019/0364450 A1 11/2019 Yao et al.

OTHER PUBLICATIONS

3GPP TS 28.541, "3rd Generation Partnership Project; Technical Specification Group Services and System Aspects; Management and orchestration; 5G Network Resource Model (NRM); Stage 2 and Stage 3 (Release 15)", V0.0.0, Dec. 2017, 9 pages.
3GPP TS 32.101, "3rd Generation Partnership Project; Technical Specification Group Services and System Aspects; Telecommunication management; Principles and high level requirements (Release 15)", V15.0.0, Sep. 2017, 68 pages.
3GPP TS 32.412, "3rd Generation Partnership Project; Technical Specification Group Services and System Aspects; Telecommunication management; Performance Management (PM) Integration Reference Point (IRP): Information Service (IS) (Release 14)", V14.0.0, Dec. 2016, 68 pages.
3GPP TS 38.331, "3rd Generation Partnership Project; Technical Specification Group Radio Access Network; NR; Radio Resource Control (RRC) protocol specification (Release 15)", V1.0.0, Dec. 2017, 187 pages.

* cited by examiner

MEASUREMENT JOB CREATION AND PERFORMANCE DATA REPORTING FOR ADVANCED NETWORKS INCLUDING NETWORK SLICING

CROSS-REFERENCE TO RELATED APPLICATION(S)

This application is a continuation of U.S. patent application Ser. No. 16/247,050, filed Jan. 14, 2019, which claims the benefit of U.S. Provisional Patent Application No. 62/618,977, filed Jan. 18, 2018, each of which is hereby incorporated by reference herein in its entirety.

TECHNICAL FIELD

This application relates generally to wireless communication systems, and more specifically to measurement job creation and performance data reporting.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN Node such as a Evolved Universal Terrestrial Radio Access network (E-UTRAN) Node B (also commonly denoted as evolved Node B, enhanced Node B, eNodeB, or eNB) and/or Radio network Controller (RNC) in an E-UTRAN, which communicate with a wireless communication device, known as user equipment (UE) and in MulteFire systems can include a MF-AP. In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Various embodiments herein may define a performance data and measurement job creation solutions for 5G networks and network slicing, based on a service based framework. The embodiments may allow different kinds of consumers to flexibly use the PM services and performance data services, to collect real-time performance data and/or periodical performance data.

Conventional solutions use PM IRP for measurement job creation between IRP Manager and IRP Agent. However, the PM IRP works for the existing management architecture, which is not a service based architecture. The existing PM functionality only supports periodical performance data collection, but not support real-time performance data collection. Additionally, the existing PM functionality does not provide the central performance data service, which can be flexibly consumed by any kinds of applications. Moreover, New Radio (NR) and NextGen (NG)-Radio Access network (RAN) performance data are different from legacy networks.

Figure 1:
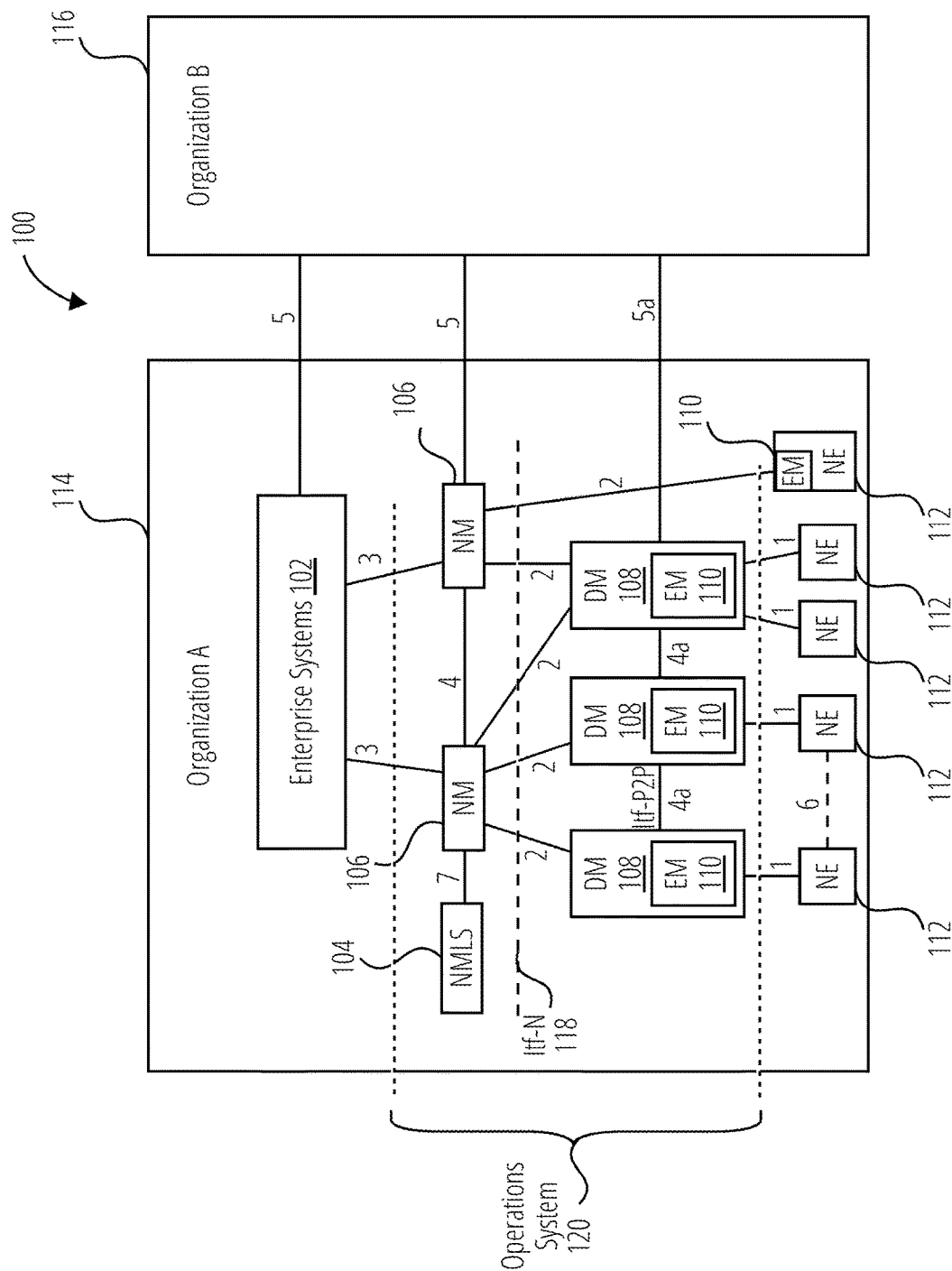
FIG. 1 illustrates an example management reference architecture in accordance with one embodiment.

For 5G networks and network slicing, network management is evolving towards a service based architecture. FIG. 1 illustrates an example management reference architecture 100, which shows an operations system 120 that supports management interfaces to other systems. The example management reference architecture 100 comprises an organization A 114 and an organization B 116. By way of example, organization A 114 is shown to have one or more of an enterprise systems 102, a network management layer service (NMLS 104), a network manager (NM 106), a domain manager (DM 108), an element manager (EM 110), a network element (NE 112), a management interface (Itf-N 118, and an operations system 120.

In the operations system 120, a number of functions are present. As examples, a network manager in the operations system 120 may include the following functions/entities: management and orchestration of network services; on-line network support for 3GPP services; network planning including radio planning; network configuration management; Self-Organizing network (SON) Management and Orchestration; alarm correlation; network event correlation; network supervision; network performance monitoring; operator terminal; Licensed Shared Access (LSA) Controller (LC); and Integration Reference Point (IRP) Manager. As examples, the Domain/Element Management layer in the operations system 120 may include the following functions/entities: network configuration management; alarm correlation; network performance monitoring; SON Management and Orchestration; operator terminal; and IRP Agent.

The operations system 120 may include management interfaces 1 between the network elements (NEs) and the Element Manager (EM) of a single PLMN Organization; management interfaces 2 between the Element Manager (EM) and the network Manager (NM) of a single PLMN Organization; management interfaces 3 between the network Managers and the Enterprise Systems of a single PLMN Organization; management interfaces 4 between the network Managers (NMs) of a single PLMN Organization; management interfaces 4a between the Domain Managers (DMs) of a single PLMN Organization; management interfaces 5 between Enterprise Systems & network Managers of different PLMN Organizations; management interfaces 5a between the Domain Managers (DMs) of different PLMN Organizations; management interfaces 6 between network Elements (NEs); management interfaces 7 between the network Management Layer Service (NMLS) and the network Manager (NM). IRPs may be implemented at interfaces 2, 3, 4, 5 and 7. Some of the management interfaces (e.g., Itf-N, Itf-P2P) may support performance management (PM) functionalities.

The existing performance measurement Integration Reference Point (IRP) works for the existing network management architecture. The existing network management architecture is not a service based architecture, and therefore does not fit to PM for 5G networks and network slicing. For 5G networks and network slicing, real-time performance data and the performance data service are to enable various applications (e.g., SON, Mobile Edge Computing (MEC), data analytics) to use the performance data. Therefore, new mechanisms for measurement job creation and performance data reporting should be defined.

The PM for 3GPP network functions (NFs) is not only used for managing the 3GPP NFs, but also for supporting the PM of NSSI, NSI and non-slice-specific network. The present disclosure provides use cases and requirements for creation of measurement jobs for 3GPP NF, NSSI, NSI and/or non-slice-specific network as part of PM services.

In order to collect the performance data (performance measurements and/or assurance data) of 3GPP NF, the measurement job may need to be created. The measurement job could be a periodical job to periodically collect the required performance data, or a real-time job to collect the real-time performance data. The real-time performance data is useful, for example, when the 5G network needs to be adapted in real-time or in low latency to support some 5G services (e.g., V2X, mission critical communication, etc.).

The performance data of 3GPP NF is not only used for managing the 3GPP NFs, but also for supporting the PM of NSSI, NSI and non-slice-specific network. Embodiments herein provide use cases and requirements on reporting of performance data of 3GPP NF, as part of NF performance data service. The performance data could be periodical performance data or real-time performance data, reporting of both kinds of performance data may need to be supported.

The PM for network slice SubNet is not only used for managing the NSSIs, but also for supporting the PM of NSI. Embodiments herein provide use cases and requirements on creation of measurement job for NSSI, as part of network slice SubNet PM service.

In order to collect the performance data (performance measurements and/or assurance data) of NSSI, the measurement job may need to be created. The measurement job could be a periodical job to periodically collect the required performance data, or a real-time job to collect the real-time performance data. The real-time performance data is useful, for example, when the 5G network needs to be adapted in real-time or in low latency to support some 5G services (e.g., V2X, mission critical communication, etc.).

The performance data of 3GPP network (NSSI, NSI or non-slice-specific network) is an aspect of 5G management. Embodiments herein provide use cases and requirements on reporting of performance data of 3GPP network, as part of network performance data service. The performance data could be periodical performance data or real-time performance data, reporting of both kinds of performance data may need to be supported.

The PM for network slice is an aspect of 5G management. Embodiments herein provide use cases and requirements on creation of measurement job for NSI, as part of network slice PM service.

In order to collect the performance data (performance measurements and/or assurance data) of NSI, the measurement job may need to be created. The measurement job could be a periodical job to periodically collect the required performance data, or a real-time job to collect the real-time performance data. The real-time performance data is useful, for example, when the 5G network needs to be adapted in real-time or in low latency to support some 5G services (e.g., V2X, mission critical communication, etc.).

The PM for non-slice-specific 3GPP network is an aspect of 5G management. Embodiments herein provide use cases and requirements on creation of measurement job for non-slice-specific 3GPP network, as part of network PM service.

In order to collect the performance data (performance measurements and/or assurance data) of non-slice-specific 3GPP network, the measurement job may need to be created. The measurement job could be a periodical job to periodically collect the required performance data, or a real-time job to collect the real-time performance data. The real-time performance data is useful, for example, when the 5G network needs to be adapted in real-time or in low latency to support some 5G services (e.g., V2X, mission critical communication, etc.).

Figure 2:
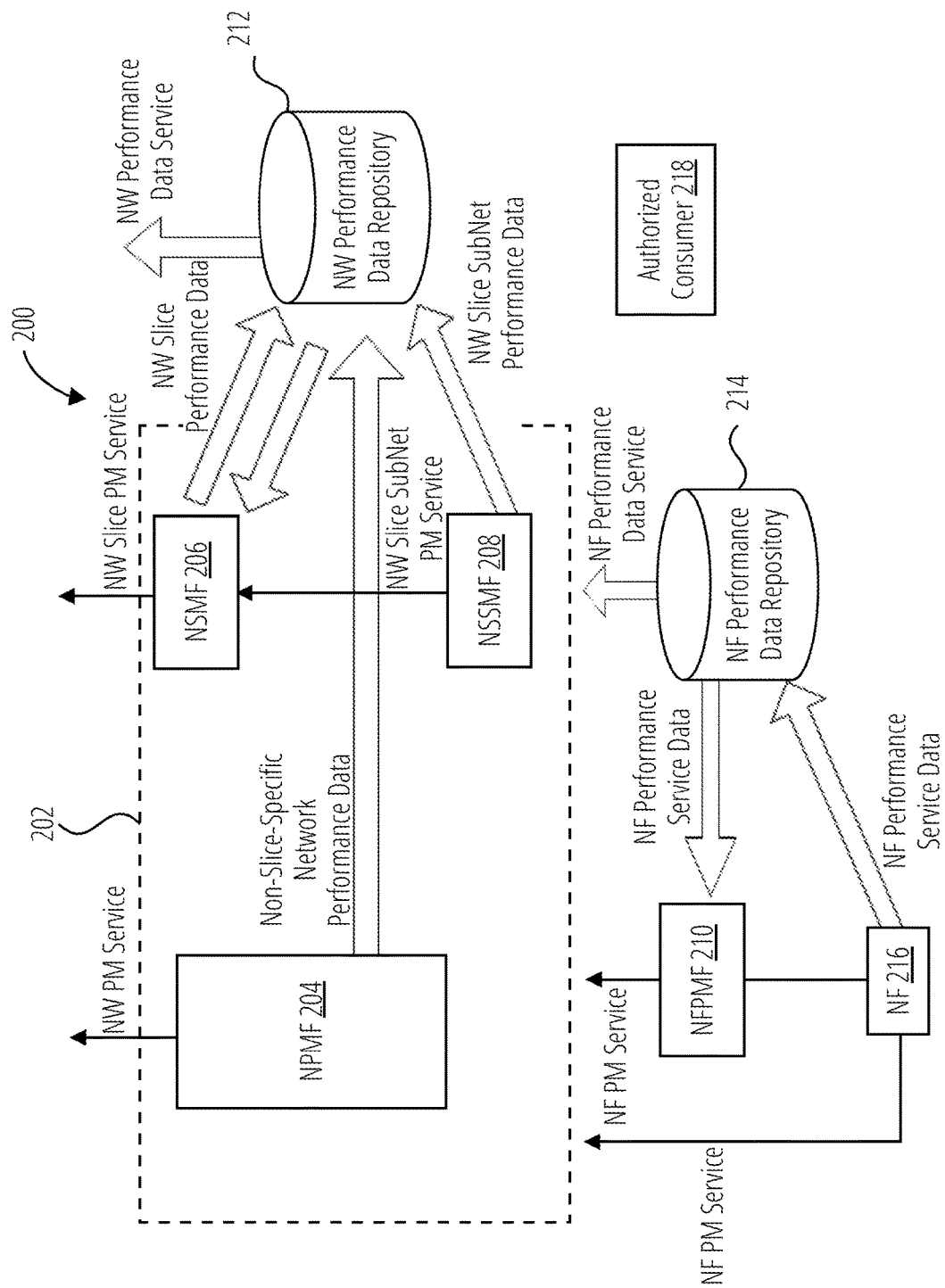
FIG. 2 illustrates an example PM service framework in accordance with one embodiment.

FIG. 2 illustrates an example PM service framework 200 for 5G networks and network (NW) slicing in accordance with one embodiment. The example PM service framework 200 comprises a network slice 202 including a network performance management function (NPMF 204), a network slice management function (NSMF 206), and a network slice subnet management function (NSSMF 208). The example PM service framework 200 also includes an NF PM function (NFPMF 210), a NW performance data repository 212 (NWPDR), an NF performance data repository 214 (NFPDR), and an NF 216. The NPMF 204, which in certain embodiments may be a network management function (NMF), provides a NW PM service and sends non-slice-specific network performance data to the NW performance data repository 212. The NSMF 206 provides NW slice PM service, sends NW slice performance data to the NW performance data repository 212, and receives NW slice subnet performance data from the NW performance data repository 212. The NSSMF 208 provides NW slice SubNet PM service to the NSMF 206 and sends NW slice subnet performance data to the NW performance data repository 212. In this example, the NW performance data repository 212 provides NW performance data services. The 216 may be any NF that provides NF PM services. In this example, the NF 216 sends NF performance data to the NF performance data repository 214. The NFPMF 210 provides NF PM services and receives NF performance data from the NF performance data repository 214. In certain embodiments, the NFPMF 210 may be a network function management function (NFMF). In this example, the NF performance data repository 214 provides NF performance data services.

The functions (e.g., NFPMF, NPMF, NSSMF, NSMF), repositories (e.g., NFPDR, NWPDR), and/or services (e.g., NF PM service, NF performance data service, NW PM service, NW slice PM service, NW slice subnet PM service) in the example PM service framework 200 and the following embodiments may be named differently, as long as they provide functions, services, or data. For example, certain embodiments described herein may simply refer to the NPMF 204, NSMF 206, NSSMF 208, NFPMF 210, and/or NF 216 as a service producer or a particular type of service producer (e.g., NF measurement job control service producer, NSSI measurement job control service producer, an NSI measurement job control service producer, a network measurement job control service producer).

FIG. 2 also shows an authorized consumer 218. The authorized consumer 218 may be any consumer of functions, data, or services. For example, as described in certain embodiments herein, the NPMF 204, the NSMF 206, the NSSMF 208, or an operator may be referred to as a consumer or an authorized consumer. As described in detail below, the service producer may enable the authorized consumer 218 to create a measurement job for collecting the performance data of NF(s), to query an ongoing NF measurement job, to get a performance data file of 3GPP NF(s), to receive a performance data stream of 3GPP NF(s), to create a measurement job for collecting performance data of a network slice subnet instance (NSSI), to query one or more ongoing NSSI measurement job, to get a performance data file of 3GPP NSSI(s), to receive a performance data stream of NSSI(s), to create a measurement job for collecting performance data of a network slice instance (NSI), to query one or more ongoing NSI measurement job, to get a performance data file of 3GPP NSI(s), to receive a performance data stream of NSI(s), to create a measurement job for collecting network/subnetwork performance data that are not specific to network slicing, to query ongoing network measurement jobs that are not specific to network slicing, to get network/subnetwork performance data that are not specific to network slicing, and/or to receive a stream of network/subnetwork performance data that are not specific to network slicing. Further, certain embodiments described herein do not use the NW performance data repository 212 and/or the NF performance data repository 214.

A. Performance Management for 3GPP NF

Figure 3:
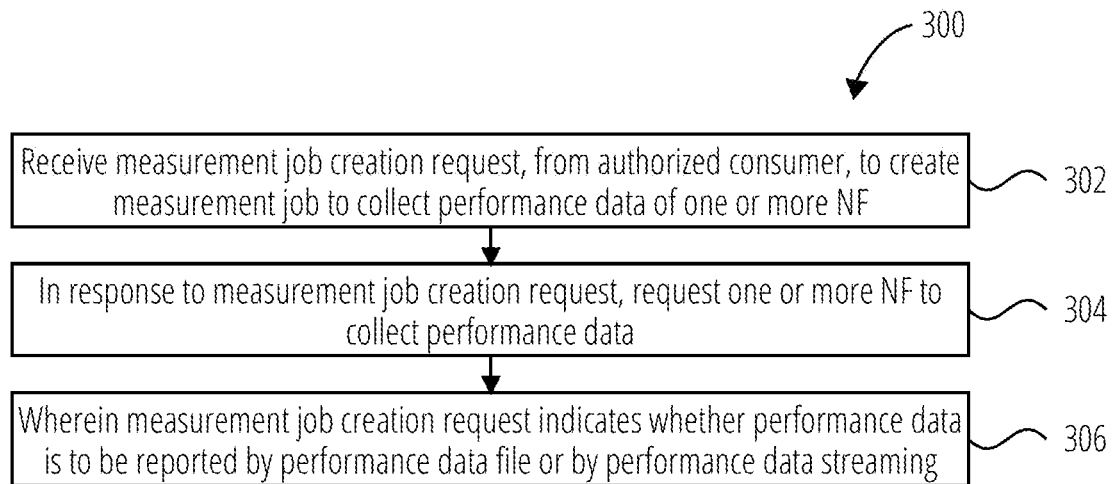
FIG. 3 illustrates a method in accordance with one embodiment for network function performance management services.

FIG. 3 is a flowchart illustrating a method 300 in accordance with one embodiment for network function performance management services. The method 300 may be performed, for example, by a service producer, such as an NFMF, NPMF, NFPMF, 3GPP NF, or NF measurement job control service producer. In block 302, the method 300 receives a measurement job creation request, from an authorized consumer, to create a measurement job to collect performance data of one or more NF. In block 304, in response to the measurement job creation request, the method 300 requests the one or more NF to collect the performance data. As shown in block 306, wherein the measurement job creation request indicates whether the performance data is to be reported by performance data file or by performance data streaming.

An example embodiment of the method 300 is shown in Table 1.

TABLE 1

| Use case stage | Evolution/Specification |
|---|---|
| Goal | To enable the authorized consumer (of NF PM service) to create a measurement job for collecting the performance data (i.e., performance measurements and/or assurance data) of 3GPP NF. |
| Actors and Roles | An authorized consumer (e.g., NSSMF, NSMF, NMPF or an operator) of NF PM service. |
| | NFPMF or NF that provides the NF PM service. |
| Telecom resources | 3GPP NF |
| | NFPDR |
| Assumptions | N/A |
| Pre-conditions | The 3GPP NF has been deployed. |
| | The NF PM service producer (NFPMF or NF) is in operation. |
| Begins when | The authorized consumer needs to create measurement job for collecting the performance data of 3GPP NF. |
| Step 1 (M) | The authorized consumer requests the NF PM service producer (i.e., NFPMF or 3GPP NF) to create measurement job to collect the performance data of 3GPP NF. |
| | The request needs to indicate that the measurement job is a periodical job or a real-time job. |

TABLE 1-continued

| Use case stage | Evolution/Specification |
| --- | --- |
| Step 2 (CM) | In case the NF PM service producer is NFPMF, the NFPMF requests the 3GPP NF to create the measurement job to collect the performance data, per the received measurement job creation request. |
| Step 3 (M) | 3GPP NF measures the networks and generates the performance data, according to the information of the measurement job. |
| Step 4 (M) | 3GPP NF reports the performance data to NFPDR, in the following way: periodically according to reporting period of the measurement job, if the measurement job is a periodical job; in real-time, if the measurement job is a real-time job. |
| Ends when | All the steps identified above are successfully completed. |
| Exceptions | One of the steps identified above fails. |
| Post-conditions | The measurement job for 3GPP NF has been created. |
| Traceability | REQ-PM_NF-FUN-1 and REQ-PM_NF-FUN-2 |

In another example, the method 300 is to enable the authorized consumer to create a measurement job for collecting the performance data of NF(s). The telecom resources include NF(s) and a producer of the NF measurement job control service (as part of NF PM service), wherein the NF(s) have been deployed and an NF measurement job control service producer is in operation. The method 300 begins when the authorized consumer needs to create a measurement job for collecting the performance data of NF(s). The authorized consumer requests the NF measurement job control service producer to create a measurement job to collect the performance data of NF(s). The request indicates that the performance data needs to be reported by performance data file (e.g., periodically) or by performance data streaming (e.g., real-time reporting). The NF measurement job control service producer requests the NF(s) to collect the performance data, per the received measurement job creation request. In certain embodiments, after the method 300, the measurement job for NF(s) has been created, and the NF measurement job control service producer generates the performance data for the NF measurement job.

An example embodiment for reporting of performance data of 3GPP NF is shown in Table 2.

TABLE 2

| Use case stage | Evolution/Specification |
| --- | --- |
| Goal | To enable the authorized consumer (of NF performance data service) to get the performance data (i.e., performance measurements and/or assurance data) of 3GPP NF. |
| Actors and Roles | An authorized consumer (e.g., NSSMF, NSMF, NMPF or an operator) of NF performance data service. NFPDR that provides the NF performance data service. |
| Telecom resources | 3GPP NF |
| Assumptions | N/A |
| Pre-conditions | The 3GPP NF has been deployed. The NF performance data service producer (NFPDR) is in operation. |
| Begins when | The authorized consumer needs to get the performance data of 3GPP NF. |
| Step 1 (M) | The authorized consumer requests the NFPDR to report the performance data of 3GPP NF. The request needs to indicate that the performance data is periodical data or real-time data. |
| Step 2 (M) | NFPDR reports the performance data of 3GPP NF to the authorized consumer, in the following way: sending performance data file ready notification to the consumer (to allow the consumer to download the performance data file), if the requested performance data is periodical data; transmitting the performance data streaming to the consumer, if the requested performance data is real-time data. |
| Ends when | All the steps identified above are successfully completed. |
| Exceptions | One of the steps identified above fails. |
| Post-conditions | The performance data of 3GPP NF have been reported. |
| Traceability | REQ-PD_NF-FUN-1, REQ-PD_NF-FUN-2, REQ-PD_NF-FUN-3 and REQ-PD_NF-FUN-4 |

Certain embodiments also include enabling the authorized consumer to query the ongoing NF measurement jobs (i.e. the NF measurement jobs that have been created by the subject consumer and not terminated). If the authorized consumer needs to query the ongoing NF measurement jobs, the authorized consumer queries the information about the ongoing NF measurement jobs from the NF measurement job control service producer. The NF measurement job control service producer then provides the information about the ongoing NF measurement jobs to the consumer.

Certain embodiments also include enabling the authorized consumer to get the performance data file of 3GPP NF(s).

When a performance data file of the 3GPP NF is ready at a NF performance data file reporting service producer, the NF performance data file reporting service producer sends a notification about performance data file ready to the authorized consumer. The authorized consumer then fetches the performance data file from the NF performance data file reporting service producer.

Certain embodiments also include enabling the authorized consumer to receive the performance data stream of 3GPP NF(s). When the performance data of the 3GPP NF is ready at the NF performance data streaming service producer, an NF performance data streaming service producer sends the NF performance data stream to the consumer.

B. Performance Management for NSSI

Figure 4:
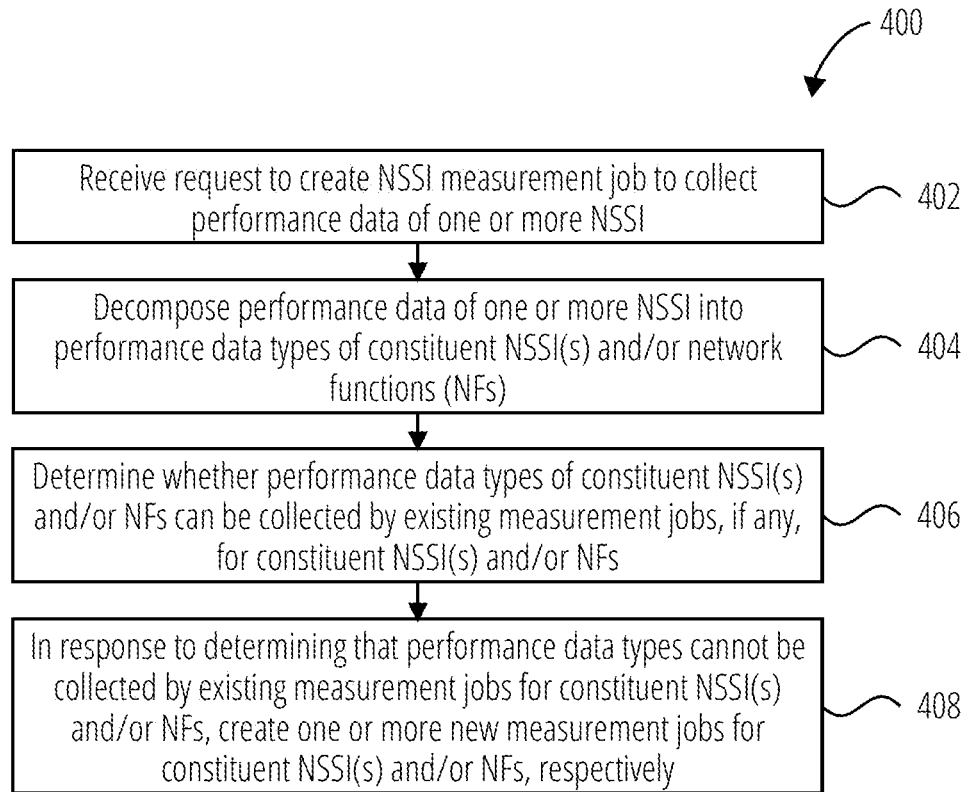
FIG. 4 illustrates a method in accordance with one embodiment for a network slice subnet instance (NSSI) measurement job control service (as part of NSSI PM service).

FIG. 4 is a flowchart in accordance with one embodiment illustrating an NSSI measurement job control service (as part of NSSI PM service). The method 400 may be performed by, for example, a service producer configured to provide a performance management service for NSSI, such as an NFPMF, 3GPP NF, or an NSSI measurement job control service producer. In block 402, the method 400 receives a request to create an NSSI measurement job to collect performance data of one or more NSSI. In block 404, the method 400 decomposes the performance data of the one or more NSSI into performance data types of constituent NSSIs and/or network functions (NFs). In block 406, the method 400 determines whether the performance data types of the constituent NSSI(s) and/or NFs can be collected by existing measurement jobs, if any, for the constituent NSSI(s) and/or NFs. In block 408, in response to determining that the performance data types cannot be collected by the existing measurement jobs for the constituent NSSI(s) and/or NFs, the method 400 creates one or more new measurement jobs for the constituent NSSI(s) and/or NFs, respectively.

An example of the method 400 is shown in Table 3.

TABLE 3

| Use case stage | Evolution/Specification |
| --- | --- |
| Goal | To enable the authorized consumer (of Network Slice SubNet PM service) to create a measurement job for collecting the performance data (i.e., performance measurements and/or assurance data) of NSSI. |
| Actors and Roles | An authorized consumer (e.g., NSMF or an operator) of Network Slice SubNet PM service. NSSMF that provides the Network Slice SubNet PM service. |
| Telecom resources | NSSI NF PM service producer (NFPMF or NF) NF performance data service producer (NFPDR) 3GPP NF |
| Assumptions | N/A |
| Pre-conditions | The NSSI has been deployed. The Network Slice SubNet PM service producer (i.e., NSSMF) is in operation. |
| Begins when | The authorized consumer needs to create measurement job for collecting the performance data of NSSI. |
| Step 1 (M) | The authorized consumer requests the NSSMF to create measurement job to collect the performance data of NSSI. The request needs to indicate that the measurement job is a periodical job or a real-time job. |
| Step 2 (M) | The NSSMF decomposes the performance data of NSSI into performance data of the constituent 3GPP NF(s). The NSSMF checks whether the decomposed performance data of the constituent 3GPP NF(s) can be collected by the existing measurement job(s) for 3GPP NF(s). If new measurement job(s) for the constituent 3GPP NF(s) are required, NSSMF requests the NF PM service producer to create the new measurement job(s) for the constituent 3GPP NF(s) (according to the use case "Creation of measurement job for 3GPP NF" as described in Table 1). |
| Step 3 (M) | NSSMF gets the performance data of the constituent NF(s) from NFPDR (according to the use case "Reporting of performance data of 3GPP NF" as described in Table 2), and generate the performance data of NSSI. |
| Step 4 (M) | NSSMF reports the performance data of NSSI to NWPDR, in the following way: periodically according to reporting period of the measurement job for the NSSI, if the measurement job is a periodical job; in real-time, if the measurement job for the NSSI is a real-time job. |
| Ends when | All the steps identified above are successfully completed. |
| Exceptions | One of the steps identified above fails. |
| Post-conditions | The measurement job for NSSI has been created. |
| Traceability | REQ-PM_NSSI-FUN-1, REQ-PM_NSSI-FUN-2, REQ-PM_NSSI-FUN-3 and REQ-PM_NSSI-FUN-4 |

In another example, the method 400 is to enable the authorized consumer to create a measurement job for collecting the performance data of NSSI(s). Telecom resources used for the 400 may include NSSI(s), an NSSI measurement job control service producer, an NF measurement job control service producer, an NF performance data file reporting service producer and/or NF performance data streaming service producer, and an NSSI performance data file reporting service producer and/or NSSI performance data streaming service producer. When the authorized consumer needs to create measurement job for collecting the performance data of NSSI(s), the authorized consumer requests the NSSI measurement job control service producer to create an NSSI measurement job to collect the performance data of NSSI(s). The request indicates that the performance data is to be reported by a performance data file (e.g., periodically) or by performance data streaming (e.g., real-time).

In response, the NSSI measurement job control service producer decomposes the performance data type(s) of NSSI into performance data type(s) of the constituent NSSI(s) and/or NF(s). The NSSI measurement job control service producer checks whether the decomposed performance data types of the constituent NSSI(s) and NF(s) can be collected by the existing measurement job(s) for NSSI(s) and/or NF(s). If new measurement job(s) for the constituent NSSI(s) and/or NF(s) are required, the NSSI measurement job control service producer consumes the NSSI measurement job control service and/or the NF measurement job control service to create the new measurement job(s) for the constituent NSSI(s) and/or NF(s), respectively (e.g., according to the example use case discussed with respect to FIG. 3). Once the measurement job for NSSI has been created, the NSSI measurement job control service producer may consume the NSSI performance data file reporting service and/or NSSI performance data streaming service to get the performance data of the constituent NSSI(s), and/or consume the NF performance data file reporting service and/or NF performance data streaming service to get the performance data of the constituent NF(s), and generate the performance data for the NSSI measurement job.

Table 4 shows example NSSI reporting of performance data of a 3GPP network.

Certain embodiments also include enabling the authorized consumer to get the performance data file of 3GPP NSSI(s). When a performance data file of 3GPP NSSI(s) is ready at the NSSI performance data file reporting service producer, the NSSI performance data file reporting service producer sends the notification about performance data file ready to the authorized consumer. Then, the authorized consumer fetches the performance data file from the NSSI performance data file reporting service producer.

Certain embodiments also include enabling the authorized consumer to receive the performance data stream of NSSI (s). When performance data of 3GPP NSSI is ready at an NSSI performance data streaming service producer, the NSSI performance data streaming service producer sends the NSSI performance data stream to the consumer.

C. Performance Management for NSI

Figure 5:
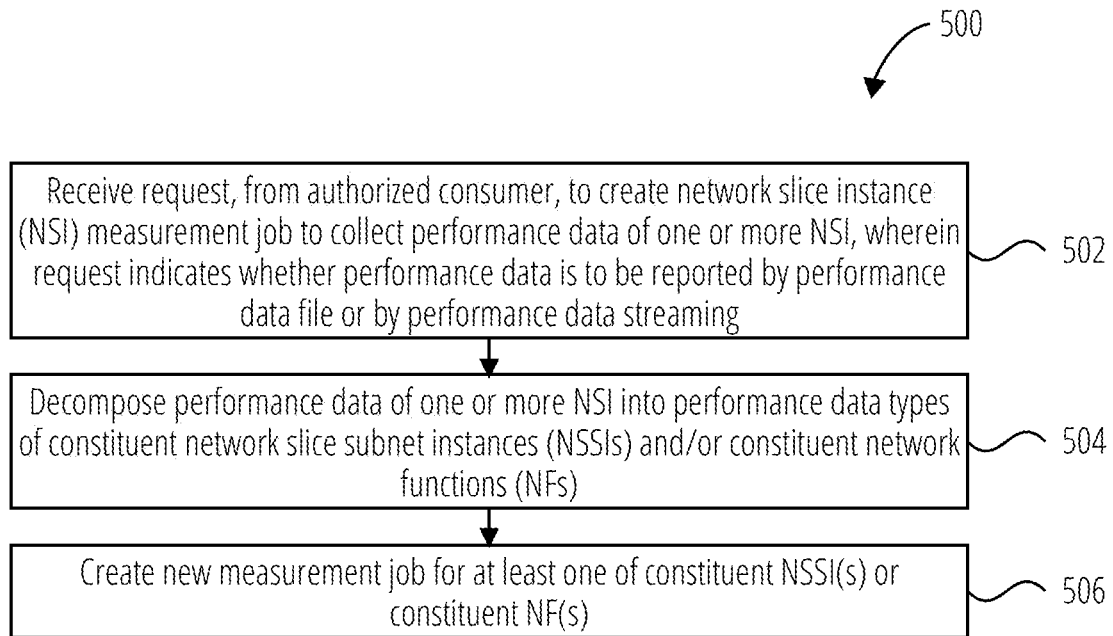
FIG. 5 illustrates a method in accordance with one embodiment performance management service for a network slice instance (NSI).

FIG. 5 is a flowchart illustrating a method 500 in accordance with one embodiment performance management service for a network slice instance (NSI). The method 500 may be performed by a service producer such as an NSMF or a producer of NSI measurement job control service (as part of NSI PM service). In block 502, the method 500 receives a request, from an authorized consumer, to create a network

TABLE 4

| Use case stage | Evolution/Specification |
| --- | --- |
| Goal | To enable the authorized consumer (of Network performance data service) to get the performance data (i.e., performance measurements and/or assurance data) of 3GPP network, which could be NSSI, NSI or a non-slice-specific network. |
| Actors and Roles | An authorized consumer (e.g., NSMF or an operator) of Network performance data service. NWPDR that provides the Network performance data service. |
| Telecom resources | 3GPP network (NSI, NSSI or non-slice-specific network) |
| Assumptions | N/A |
| Pre-conditions | The 3GPP network, whose performance data are to be reported, has been deployed. The Network performance data service producer (NWPDR) is in operation. |
| Begins when | The authorized consumer needs to get the performance data of 3GPP network. |
| Step 1 (M) | The authorized consumer requests the NWPDR to report the performance data of the 3GPP network. The request needs to indicate that the performance data is periodical data or real-time data. |
| Step 2 (M) | NWPDR reports the performance data of 3GPP network to the authorized consumer, in the following way: sending performance data file ready notification to the consumer (to allow the consumer to download the performance data file), if the requested performance data is periodical data; transmitting the performance data streaming to the consumer, if the requested performance data is real-time data. |
| Ends when | All the steps identified above are successfully completed. |
| Exceptions | One of the steps identified above fails. |
| Post-conditions | The performance data of 3GPP network have been reported. |
| Traceability | REQ-PD_NW-FUN-1, REQ-PD_NW-FUN-2, REQ-PD_NW-FUN-3 and REQ-PD_NW-FUN-4 |

Certain embodiments also include enabling the authorized consumer to query the ongoing NSSI measurement jobs (i.e. the NSSI measurement jobs that have been created by the subject consumer and not terminated). When the authorized consumer needs to query the ongoing NSSI measurement jobs, the authorized consumer queries the information about the ongoing NSSI measurement jobs from the NSSI measurement job control service producer. In response, the NSSI measurement job control service producer provides the information about the ongoing NSSI measurement jobs to the consumer.

slice instance (NSI) measurement job to collect performance data of one or more NSI, wherein the request indicates whether the performance data is to be reported by performance data file or by performance data streaming. In block 504, the method 500 decomposes the performance data of the one or more NSI into performance data types of constituent network slice subnet instances (NSSIs) and/or constituent network functions (NFs). In block 506, the method 500 creates a new measurement job for at least one of the constituent NSSI(s) or the constituent NF(s).

Creating the new measurement job may include determining whether decomposed performance data of the constituent NSSI(s) can be collected by existing measurement job(s) for NSSI(s). In response to determining that the decomposed performance data of the constituent NSSI(s) cannot be collected by the existing measurement job(s) for NSSI(s), the method 500 may also include creating the new measurement job for the constituent NSSI(s).

In addition, or in other embodiments, creating the new measurement job includes determining whether decomposed performance data of the constituent NF(s) can be collected by existing measurement job(s) for NF(s). In response to determining that the decomposed performance data of the constituent NF(s) cannot be collected by the existing measurement job(s) for NF(s), the method 500 includes requesting an NF PM service producer to create the new measurement job for the constituent NF(s).

An example of the method 500 is shown in Table 5.

the performance data of NSI(s). Telecom resources may include NSI(s), a set of an NSI measurement job control service producer, an NSSI performance data file reporting service producer and/or NSSI performance data streaming service producer; and/or a set of the NF measurement job control service producer, NF performance data file reporting service producer and/or NF performance data streaming service producer. When the authorized consumer needs to create measurement job for collecting the performance data of NSI(s), the authorized consumer requests the NSI measurement job control service producer to create an NSI measurement job to collect the performance data of NSI(s). The request indicates that the performance data is to be reported by performance data file or by performance data streaming. In response, the NSI measurement job control service producer decomposes the performance data type of

TABLE 5

| Use case stage | Evolution/Specification |
| --- | --- |
| Goal | To enable the authorized consumer (of Network Slice PM service) to create a measurement job for collecting the performance data (i.e., performance measurements and/or assurance data) of NSI. |
| Actors and Roles | An authorized consumer (e.g., an operator) of Network Slice PM service. NSMF that provides the Network Slice PM service. |
| Telecom resources | NSI<br>NSSI<br>Network Slice SubNet PM service producer (NSMF)<br>Network performance data service producer (NWPDR)<br>NF PM service producer (NFPMF or NF)<br>NF performance data service producer (NFPDR) |
| Assumptions | N/A |
| Pre-conditions | The NSI has been deployed.<br>The Network Slice PM service producer (i.e., NSMF) is in operation. |
| Begins when | The authorized consumer needs to create measurement job for collecting the performance data of NSI. |
| Step 1 (M) | The authorized consumer requests the NSMF to create measurement job to collect the performance data of NSI.<br>The request needs to indicate that the measurement job is a periodical job or a real-time job. |
| Step 2 (M) | The NSMF decomposes the performance data of NSSI into performance data of the constituent NSSI(s) and/or of constituent 3GPP NF(s).<br>The NSMF checks whether the decomposed performance data of the constituent NSSI(s) can be collected by the existing measurement job(s) for NSSI(s). If new measurement job(s) for the constituent NSSI(s) are required, NSSMF requests the Network Slice SubNet PM service producer to create the new measurement job(s) for the constituent NSSI(s) (according to the use case "Creation of measurement job for 3GPP NF" as described in clause 5.1.2.x).<br>The NSMF checks whether the decomposed performance data of the constituent 3GPP NF(s) can be collected by the existing measurement job(s) for 3GPP NF(s). If new measurement job(s) for the constituent 3GPP NF(s) are required, NSSMF requests the NF PM service producer to create the new measurement job(s) for the constituent 3GPP NF(s) (according to the use case "Creation of measurement job for 3GPP NF" as described in Table 1). |
| Step 3 (M) | NSMF gets the performance data of the constituent NSSI(s) from NWPDR (according to the use case "Reporting of performance data of 3GPP network" as described in clause 5.1.y.1).<br>If the performance data decomposition in Step 2 contains the performance data of constituent 3GPP NFs, NSMF gets the performance data of the constituent 3GPP NF(s) from NFPDR (according to the use case "Reporting of performance data of 3GPP NF" as described in Table 2).<br>NSMF generates the performance data of NSI based on the obtained performance data of constituent NSSI(s) and/or of constituent 3GPP NF(s). |
| Step 4 (M) | NSMF reports the performance data of NSI to NWPDR, in the following way:<br>periodically according to reporting period of the measurement job for the NSI, if the measurement job is a periodical job;<br>in real-time, if the measurement job for the NSI is a real-time job. |
| Ends when | All the steps identified above are successfully completed. |
| Exceptions | One of the steps identified above fails. |
| Post-conditions | The measurement job for NSI has been created. |
| Traceability | REQ-PM_NSI-FUN-1, REQ-PM_NSI-FUN-2, REQ-PM_NSI-FUN-3 and REQ-PM_NSI-FUN-4 |

In another example, the method 500 enables the authorized consumer to create a measurement job for collecting NSI(s) into performance data type(s) of the constituent NSSI(s) and/or of constituent NF(s).

The NSI measurement job control service producer checks whether the decomposed performance data of the constituent NSSI(s) can be collected by the existing measurement job(s) for NSSI(s). If new measurement job(s) for the constituent NSSI(s) are required, the NSI measurement job control service producer consumes the NSSI measurement job control service to create the new measurement job(s) for the constituent NSSI(s) (e.g., according to the example use case discussed with respect to FIG. 4). In addition or in other embodiments, the NSI measurement job control service producer checks whether the decomposed performance data of the constituent NF(s) can be collected by the existing measurement job(s) for NF(s). If new measurement job(s) for the constituent NF(s) are required, NSI measurement job control service producer requests the NF PM measurement job control service producer to create the new measurement job(s) for the constituent NF(s) (e.g., according to the example use case discussed with respect to FIG. 3).

When the measurement job for NSI has been created, the NSI measurement job control service producer may consume the NSSI performance data file reporting service, the NSSI performance data streaming service, the NF performance data file reporting service and/or NF performance data streaming service to get the performance data of the constituent NSSI(s) and/or NF(s), and generates the performance data for the NSI measurement job.

Certain embodiments also include enabling the authorized consumer to query the ongoing NSI measurement jobs (i.e. the NSI measurement jobs that have been created by the subject consumer and not terminated). When the authorized consumer needs to query the ongoing NSI measurement jobs, the authorized consumer queries the information about the ongoing NSI measurement jobs from the NSI measurement job control service producer. In response, the NSI measurement job control service producer provides the information about the ongoing NSI measurement jobs to the consumer.

Certain embodiments also include enabling the authorized consumer to get the performance data file of 3GPP NSI(s). When the performance data file of 3GPP NSI(s) is ready at the NSI performance data file reporting service producer, the NSI performance data file reporting service producer sends the notification about performance data file ready to the authorized consumer. In response, the authorized consumer fetches the performance data file from the NSI performance data file reporting service producer.

Certain embodiments also include enabling the authorized consumer to receive the performance data stream of NSI(s). When the performance data of 3GPP NSI is ready at the NSI performance data streaming service producer, the NSI performance data streaming service producer sends the NSI performance data stream to the consumer.

D. Performance Management for Non-Slice-Specific 3GPP Network

Figure 6:
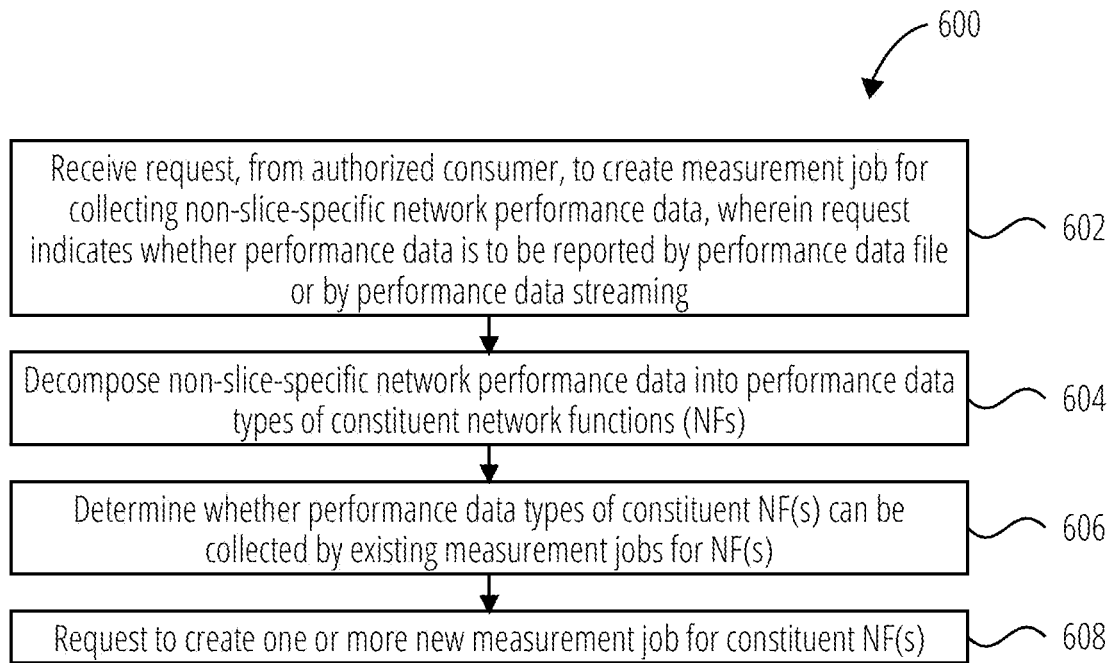
FIG. 6 illustrates a method for collecting network or sub-network performance data that are not specific to network slicing in accordance with one embodiment.

FIG. 6 is a flowchart illustrating a method 600 for collecting network or sub-network performance data that are not specific to network slicing in accordance with one embodiment. The method 500 may be performed by a service producer such as an NPMF or a producer of network measurement job control service (as part of network PM service). In block 602, the method 600 receives a request, from an authorized consumer, to create a measurement job for collecting non-slice-specific network performance data, wherein the request indicates whether the performance data is to be reported by performance data file or by performance data streaming. In block 604, the method 600 decomposes the non-slice-specific network performance data into performance data types of constituent network functions (NFs). In block 606, the method 600 determines whether the performance data types of the constituent NF(s) can be collected by existing measurement jobs for NF(s). In block 608, the method 600 requests to create one or more new measurement job for the constituent NF(s).

An example of the method 600 is shown in Table 6.

TABLE 6

| Use case stage | Evolution/Specification |
|---|---|
| Goal | To enable the authorized consumer (of Network PM service) to create a measurement job for collecting the performance data (i.e., performance measurements and/or assurance data) of non-slice-specific 3GPP network. |
| Actors and Roles | An authorized consumer (e.g., an operator) of Network PM service. NPMF that provides the Network PM service. |
| Telecom resources | Non-slice-specific 3GPP network Network performance data service producer (NWPDR) NF PM service producer (NFPMF or NF) NF performance data service producer (NFPDR) |
| Assumptions | N/A |
| Pre-conditions | The non-slice-specific 3GPP network has been deployed. The Network PM service producer (i.e., NPMF) is in operation. |
| Begins when | The authorized consumer needs to create measurement job for collecting the performance data of non-slice-specific 3GPP network. |
| Step 1 (M) | The authorized consumer requests the NPMF to create measurement job to collect the performance data of non-slice-specific 3GPP network. The request needs to indicate that the measurement job is a periodical job or a real-time job. |
| Step 2 (M) | The NPMF decomposes the performance data of non-slice-specific 3GPP network into performance data of the constituent 3GPP NF(s). The NPMF checks whether the decomposed performance data of the constituent 3GPP NF(s) can be collected by the existing measurement job(s) for 3GPP NF(s). If new measurement job(s) for the constituent 3GPP NF(s) are required, NPMF requests the NF PM service producer to create the new measurement job(s) for the constituent 3GPP NF(s) (according to the use case "Creation of measurement job for 3GPP NF" as described in Table 1). |

TABLE 6-continued

| Use case stage | Evolution/Specification |
| --- | --- |
| Step 3 (M) | NPMF gets the performance data of the constituent NF(s) from NFPDR (according to the use case "Reporting of performance data of 3GPP NF" as described in Table 2), and generate the performance data of non-slice-specific 3GPP network. |
| Step 4 (M) | NPMF reports the performance data of non-slice-specific 3GPP network to NWPDR, in the following way:<br>periodically according to reporting period of the measurement job for the non-slice-specific 3GPP network, if the measurement job is a periodical job;<br>in real-time, if the measurement job for the non-slice-specific 3GPP network is a real-time job. |
| Ends when | All the steps identified above are successfully completed. |
| Exceptions | One of the steps identified above fails. |
| Post-conditions | The measurement job for non-slice-specific 3GPP network has been created. |
| Traceability | REQ-PM_NW-FUN-1, REQ-PM_NW-FUN-2, REQ-PM_NW-FUN-3 and REQ-PM_NW-FUN-4 |

In another example, the method 600 enables the authorized consumer to create a measurement job for collecting the network/sub-network performance data that are not specific to network slicing. The telecom resources may be network(s)/sub-network(s), a network measurement job control service producer, an NF measurement job control service producer, an NF performance data file reporting service producer, and/or an NF performance data streaming service producer. When the authorized consumer needs to create a network measurement job for collecting the network performance data that are not specific to network slicing, the authorized consumer requests the network measurement job control service producer to create measurement job to collect the network performance data that are not specific to network slicing.

The request indicates that the performance data are to be reported by performance data file or by performance data streaming. In response, the network measurement job control service producer decomposes the performance data type of network/sub-network into performance data type(s) of the constituent 3GPP NF(s). The network measurement job control service producer determines whether the decomposed performance data type(s) of the constituent NF(s) can be collected by the existing measurement job(s) for NF(s). If new measurement job(s) for the constituent NF(s) are required, the network measurement job control service producer requests the NF measurement job control service producer to create the new measurement job(s) for the constituent NF(s) (e.g., according to the use case described in relation to FIG. 3). In certain embodiments, once the measurement job for network(s)/sub-network(s) has been created, the network measurement job control service producer consumes the NF performance data file reporting service and/or NF performance data streaming service to get the performance data of the constituent NF(s), and generates the performance data for the network measurement job.

Certain embodiments also enable the authorized consumer to query the ongoing network measurement jobs (i.e., the network measurement jobs that have been created by the subject consumer and not terminated). When the authorized consumer needs to query the ongoing network measurement jobs, the authorized consumer queries the information about the ongoing network measurement jobs from the network measurement job control service producer. In response, the network measurement job control service producer provides the information about the ongoing network measurement jobs to the consumer.

Certain embodiments also enable the authorized consumer to get the network/sub-network performance data that are not specific to network slicing. When the performance data file of network/sub-network is ready at the network/sub-network performance data file reporting service producer, the network/sub-network performance data file reporting service producer sends the notification about performance data file ready to the authorized consumer. The authorized consumer then fetches the network/sub-network performance data file from the network/sub-network performance data file reporting service producer.

Certain embodiments also enable the authorized consumer to receive the stream of the network/sub-network performance data that are not specific to network slicing. When the performance data of network is ready at the network/sub-network performance data streaming service producer, the network/sub-network performance data streaming service producer sends the network/sub-network performance data stream to the consumer.

E. Example Requirements

The following are some example requirements for certain embodiments herein. See, for example, the "Traceability" sections of Tables 1-6.

E(1) Requirements for NF PM Service

REQ-PM NF-FUN-1: The NF PM service producer (i.e., NFPMF or 3GPP NF) has the capability allowing its authorized consumer to create a periodical measurement job to collect the performance data of 3GPP NF.

REQ-PM NF-FUN-2: The NF PM service producer (i.e., NFPMF or 3GPP NF) has the capability allowing its authorized consumer to create a real-time measurement job to collect the performance data of 3GPP NF.

E(2) Requirements for NF Performance Data Service

REQ-PD NF-FUN-1: The NF performance data service producer (i.e., NFPDR) has the capability allowing its authorized consumer to get the periodical performance data of 3GPP NF.

REQ-PD NF-FUN-2: The NF performance data service producer (i.e., NFPDR) has the capability allowing its authorized consumer to get the real-time performance data of 3GPP NF.

REQ-PD NF-FUN-3: The NF performance data service producer (i.e., NFPDR) has the capability to send the performance data file ready notification (for the periodical performance data of 3GPP NF) to its authorized consumer.

REQ-PD NF-FUN-4: The NF performance data service producer (i.e., NFPDR) has the capability to transmit the performance data streaming (for the real-time performance data of 3GPP NF) to its authorized consumer.

E(3) Requirements for Network Slice SubNet PM Service

REQ-PM NSSI-FUN-1: The network slice SubNet PM service producer (i.e., NSSMF) has the capability allowing its authorized consumer to create a periodical measurement job to collect the performance data of NSSI.

REQ-PM NSSI-FUN-2: The network slice SubNet PM service producer (i.e., NSSMF) has the capability allowing its authorized consumer to create a real-time measurement job to collect the performance data of NSSI.

REQ-PM NSSI-FUN-3: The network slice SubNet PM service producer (i.e., NSSMF) has the capability to report the periodical performance data of NSSI to NWPDR.

REQ-PM NSSI-FUN-4: The network slice SubNet PM service producer (i.e., NSSMF) has the capability to report the real-time performance data of NSSI to NWPDR.

E(4) Requirements for Network Performance Data Service

REQ-PD NW-FUN-1: The network performance data service producer (i.e., NWPDR) has the capability allowing its authorized consumer to get the periodical performance data of 3GPP network (i.e., NSSI, NSI or non-slice specific 3GPP network).

REQ-PD NW-FUN-2: The network performance data service producer (i.e., NWPDR) has the capability allowing its authorized consumer to get the real-time performance data of 3GPP network (i.e., NSSI, NSI or non-slice specific 3GPP network).

REQ-PD NW-FUN-3: The network performance data service producer (i.e., NWPDR) has the capability to send the performance data file ready notification (for the periodical performance data of 3GPP network) to its authorized consumer.

REQ-PD NW-FUN-4: The network performance data service producer (i.e., NWPDR) has the capability to transmit the performance data streaming (for the real-time performance data of 3GPP network) to its authorized consumer.

E(5) Requirements for Network Slice PM Service

REQ-PM NSI-FUN-1: The network slice PM service producer (i.e., NSMF) has the capability allowing its authorized consumer to create a periodical measurement job to collect the performance data of NSI.

REQ-PM NSI-FUN-2: The network slice PM service producer (i.e., NSMF) has the capability allowing its authorized consumer to create a real-time measurement job to collect the performance data of NSI.

REQ-PM NSI-FUN-3: The network slice PM service producer (i.e., NSMF) has the capability to report the periodical performance data of NSI to NWPDR.

REQ-PM NSI-FUN-4: The network slice PM service producer (i.e., NSMF) has the capability to report the real-time performance data of NSI to NWPDR.

E(6) Requirements for Network PM Service

REQ-PM NW-FUN-1: The network PM service producer (i.e., NPMF) has the capability allowing its authorized consumer to create a periodical measurement job to collect the performance data of non-slice-specific 3GPP network.

REQ-PM NW-FUN-2: The network PM service producer (i.e., NPMF) has the capability allowing its authorized consumer to create a real-time measurement job to collect the performance data of non-slice-specific 3GPP network.

REQ-PM NW-FUN-3: The network PM service producer (i.e., NPMF) has the capability to report the periodical performance data of non-slice-specific 3GPP network to NWPDR.

REQ-PM NW-FUN-4: The network PM service producer (i.e., NPMF) has the capability to report the real-time performance data of non-slice-specific 3GPP network to NWPDR.

F. Example Use Case on Monitoring of RRC Connection Establishment

Radio resource control (RRC) connection establishment is a useful procedure in NR and NG-RAN. Without an RRC connection established, the UE generally cannot connect to NR or NG-RAN. The performance (e.g., success rate) of RRC connection establishment has direct impact to the end user experience. When the NR or NG-RAN supports the network slicing, the gNB may support multiple NSIs and each NSI may be used to support some specific communication service, therefore each NSI may have its own priority in radio resource management. So, in certain embodiments, the RRC connection establishment may need to be monitored per NSI that the gNB supports. The performance measurements related to RRC connection establishment are useful for evaluation, optimization and performance assurance of the network (including NSI, NSSI or non-slice-specific network).

The following examples are directed to RRC connection related measurements for RRC connection establishment.

F(1) Attempted RRC Connection Establishments a) This measurement provides the number of RRC connection establishment attempts. This measurement is split into subcounters for each establishment cause, and for each NSI.
b) CC
c) Receipt of an RRCConnectionRequest message by the gNB from the UE. Each received RRCConnectionRequest message is added to the relevant subcounter for the establishment cause and the relevant subcounter for the NSI. The possible establishment causes are included in TS 38.331. The sum of all supported per cause measurements shall equal the total number of RRCConnectionRequest messages. In case only a subset of per cause measurements is supported, a sum subcounter will be provided first.
Note that the RRC message name in the trigger may be changed in later standard releases, but the underlying concept is the same.
d) Each measurement is an integer value.
e) The measurement name has the forms: RRC.ConnEstabAtt.Cause where Cause identifies the establishment cause; and RRC.ConnEstabAttNSI.NSI where NSI corresponds to the NSI ID (see TS 23.501).
f) GNBCuFunction (see TS 28.541), for the gNB 2 functional split scenario; GNBCuCpFunction (see TS 28.541), for the gNB 3 functional split scenario; and GNB-Function (see TS 28.541), for the gNB non-split scenario.

Note that the IOC name may be revisited and aligned with the NRM definitions in TS 28.541.

g) Valid for packet switched traffic
h) 5GS
i) One usage of this measurement is for performance assurance.

F(2) Successful RRC Connection Establishments a) This measurement provides the number of successful RRC connection establishments. This measurement is split into subcounters for each establishment cause, and for each NSI.

b) CC c) Receipt of an RRCConnectionSetupComplete message by the gNB from the UE.

Each received RRCConnectionSetupComplete message is added to the relevant subcounter for the establishment cause and the relevant subcounter for the NSI. The possible establishment causes are included in TS 38.331. The sum of all supported per cause measurements shall equal the total number of RRCConnectionSetupComplete messages. In case only a subset of per cause measurements is supported, a sum subcounter will be provided first.

Note that the RRC message name in the trigger may be revisited.

d) Each measurement is an integer value.

e) The measurement name has the forms: RRC.ConnEstabSucc.Cause where Cause identifies the establishment cause; and RRC.ConnEstabSuccNSI.NSI where NSI corresponds to the NSI ID (see TS 23.501).

f) GNBCuFunction (see 28.541 [x]), for the gNB functional split scenario; GNBCuCpFunction (see 28.541 [x]), for the gNB 3 functional split scenario; GNBFunction (see 28.541 [x]), for the gNB non-split scenario.

Note that the IOC name may be revisited and aligned with the NRM definitions in TS 28.541.

g) Valid for packet switched traffic
h) 5GS
i) One usage of this measurement is for performance assurance.

F(3) Failed RRC Connection Establishment Per Failure Cause a) This measurement provides the number of failed RRC connection establishments. This measurement is split into subcounters for each failure cause.

b) CC c) Transmission of an RRCConnectionReject message by the gNB from the UE. Each transmitted RRCConnectionReject message is added to the relevant subcounter for the failure cause. The possible failure causes are included in TS 38.331. The sum of all supported per cause measurements shall equal the total number of RRCConnectionReject messages. In case only a subset of per cause measurements is supported, a sum subcounter will be provided first.

Note that the RRC message name in the trigger may be revisited.

d) Each measurement is an integer value.

e) The measurement name has the form RRC.ConnEstabFail.Cause where Cause identifies the failure cause.

f) GNBCuFunction (see 28.541 [x]), for the gNB functional split scenario; GNBCuCpFunction (see 28.541 [x]), for the gNB 3 functional split scenario; GNBFunction (see 28.541 [x]), for the gNB non-split scenario.

Note that the IOC name may be revisited and aligned with the NRM definitions in TS 28.541.

g) Valid for packet switched traffic
h) 5GS
i) One usage of this measurement is for performance assurance.

G. Example Embodiments

Figure 7:
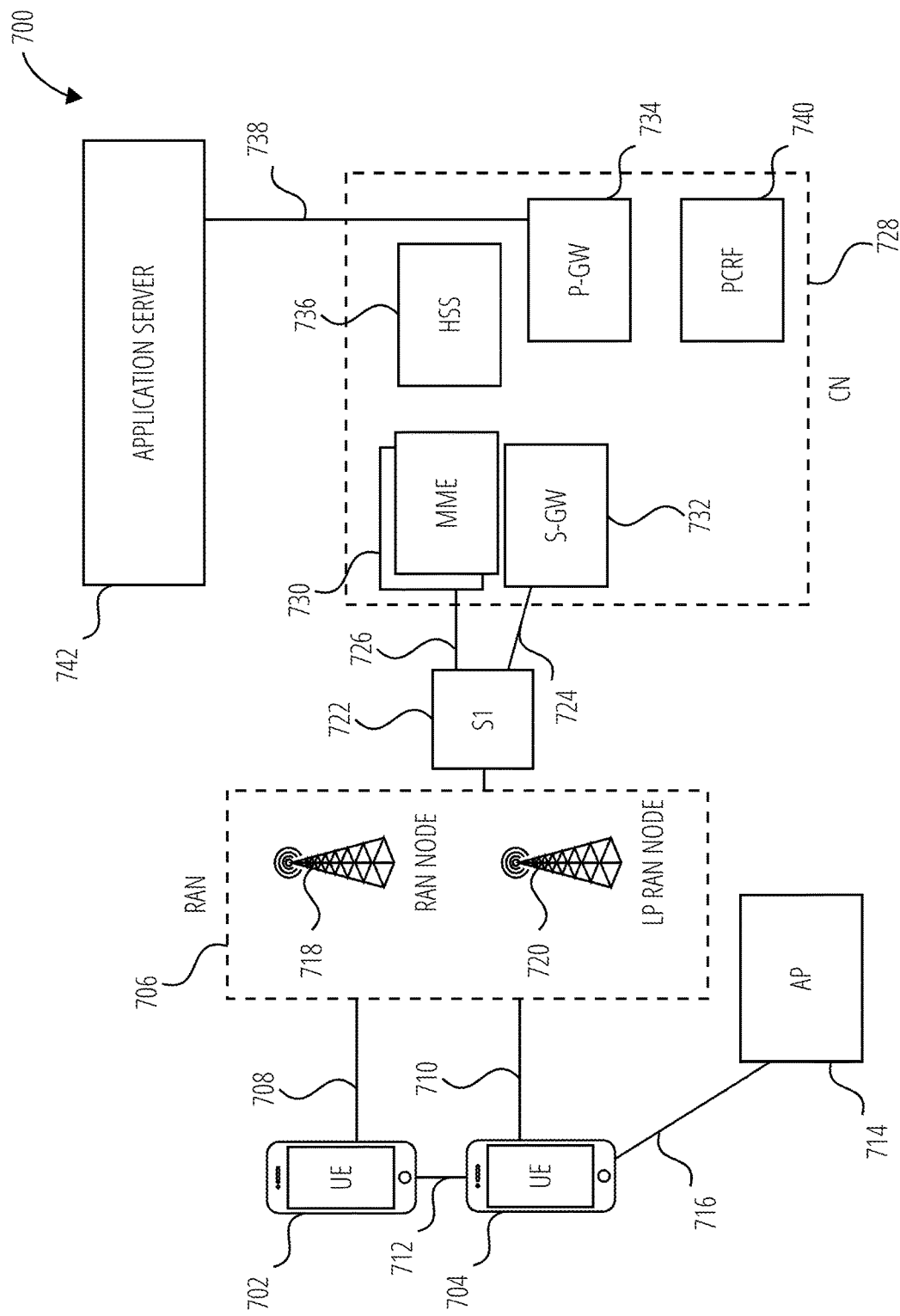
FIG. 7 illustrates a system in accordance with one embodiment.

FIG. 7 illustrates an architecture of a system 700 of a network in accordance with some embodiments. The system 700 includes one or more user equipment (UE), shown in this example as a UE 702 and a UE 704. The UE 702 and the UE 704 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 702 and the UE 704 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 702 and the UE 704 may be configured to connect, e.g., communicatively couple, with a radio access network (RAN), shown as RAN 706. The RAN 706 may be, for example, an Evolved Universal Mobile Telecommunications System (UMTS) Terrestrial Radio Access Network (E-UTRAN), a NextGen RAN (NG RAN), or some other type of RAN. The UE 702 and the UE 704 utilize connection 708 and connection 710, respectively, each of which comprises a physical communications interface or layer (discussed in further detail below); in this example, the connection 708 and the connection 710 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 702 and the UE 704 may further directly exchange communication data via a ProSe interface 712. The ProSe interface 712 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 704 is shown to be configured to access an access point (AP), shown as AP 714, via connection 716. The connection 716 can comprise a local wireless connection, such as a connection consistent with any IEEE 802.11 protocol, wherein the AP 714 would comprise a wireless fidelity (WiFi®) router. In this example, the AP 714 may be connected to the Internet without connecting to the core network of the wireless system (described in further detail below).

The RAN 706 can include one or more access nodes that enable the connection 708 and the connection 710. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 706 may include one or more RAN nodes for providing macrocells, e.g., macro RAN node 718, and one or more RAN nodes for providing femtocells or picocells (e.g., cells having smaller coverage areas, smaller user capacity, or higher bandwidth compared to macrocells), e.g., a low power (LP) RAN node such as LP RAN node 720.

Any of the macro RAN node 718 and the LP RAN node 720 can terminate the air interface protocol and can be the first point of contact for the UE 702 and the UE 704. In some embodiments, any of the macro RAN node 718 and the LP RAN node 720 can fulfill various logical functions for the RAN 706 including, but not limited to, radio network controller (RNC) functions such as radio bearer management, uplink and downlink dynamic radio resource management and data packet scheduling, and mobility management.

In accordance with some embodiments, the UE 702 and the UE 704 can be configured to communicate using Orthogonal Frequency-Division Multiplexing (OFDM) communication signals with each other or with any of the macro RAN node 718 and the LP RAN node 720 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub-carriers.

In some embodiments, a downlink resource grid can be used for downlink transmissions from any of the macro RAN node 718 and the LP RAN node 720 to the UE 702 and the UE 704, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 702 and the UE 704. The physical downlink control channel (PDCCH) may carry information about the transport format and resource allocations related to the PDSCH channel, among other things. It may also inform the UE 702 and the UE 704 about the transport format, resource allocation, and H-ARQ (Hybrid Automatic Repeat Request) information related to the uplink shared channel. Typically, downlink scheduling (assigning control and shared channel resource blocks to the UE 704 within a cell) may be performed at any of the macro RAN node 718 and the LP RAN node 720 based on channel quality information fed back from any of the UE 702 and UE 704. The downlink resource assignment information may be sent on the PDCCH used for (e.g., assigned to) each of the UE 702 and the UE 704.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 706 is communicatively coupled to a core network (CN), shown as CN 728—via an S1 interface 722. In embodiments, the CN 728 may be an evolved packet core (EPC) network, a NextGen Packet Core (NPC) network, or some other type of CN. In this embodiment the S1 interface 722 is split into two parts: the S1-U interface 724, which carries traffic data between the macro RAN node 718 and the LP RAN node 720 and a serving gateway (S-GW), shown as S-GW 732, and an S1-mobility management entity (MME) interface, shown as S1-MME interface 726, which is a signaling interface between the macro RAN node 718 and LP RAN node 720 and the MME(s) 730.

In this embodiment, the CN 728 comprises the MME(s) 730, the S-GW 732, a Packet Data Network (PDN) Gateway (P-GW) (shown as P-GW 734), and a home subscriber server (HSS) (shown as HSS 736). The MME(s) 730 may be similar in function to the control plane of legacy Serving General Packet Radio Service (GPRS) Support Nodes (SGSN). The MME(s) 730 may manage mobility aspects in access such as gateway selection and tracking area list management. The HSS 736 may comprise a database for network users, including subscription-related information to support the network entities' handling of communication sessions. The CN 728 may comprise one or several HSS 736, depending on the number of mobile subscribers, on the capacity of the equipment, on the organization of the network, etc. For example, the HSS 736 can provide support for routing/roaming, authentication, authorization, naming/addressing resolution, location dependencies, etc.

The S-GW 732 may terminate the S1 interface 322 towards the RAN 706, and routes data packets between the RAN 706 and the CN 728. In addition, the S-GW 732 may be a local mobility anchor point for inter-RAN node handovers and also may provide an anchor for inter-3GPP mobility. Other responsibilities may include lawful intercept, charging, and some policy enforcement.

The P-GW 734 may terminate an SGi interface toward a PDN. The P-GW 734 may route data packets between the CN 728 (e.g., an EPC network) and external networks such as a network including the application server 742 (alternatively referred to as application function (AF)) via an Internet Protocol (IP) interface (shown as IP communications interface 738). Generally, an application server 742 may be an element offering applications that use IP bearer resources with the core network (e.g., UMTS Packet Services (PS) domain, LTE PS data services, etc.). In this embodiment, the P-GW 734 is shown to be communicatively coupled to an application server 742 via an IP communications interface 738. The application server 742 can also be configured to support one or more communication services (e.g., Voice-over-Internet Protocol (VoIP) sessions, PTT sessions, group communication sessions, social networking services, etc.) for the UE 702 and the UE 704 via the CN 728.

The P-GW 734 may further be a node for policy enforcement and charging data collection. A Policy and Charging Enforcement Function (PCRF) (shown as PCRF 740) is the policy and charging control element of the CN 728. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 740 may be communicatively coupled to the application server 742 via the P-GW 734. The application server 742 may signal the PCRF 740 to indicate a new service flow and select the appropriate Quality of Service (QoS) and charging parameters. The PCRF 740 may provision this rule into a Policy and Charging Enforcement Function (PCEF) (not shown) with the appropriate traffic flow template (TFT) and QoS class of identifier (QCI), which commences the QoS and charging as specified by the application server 742.

Figure 8:
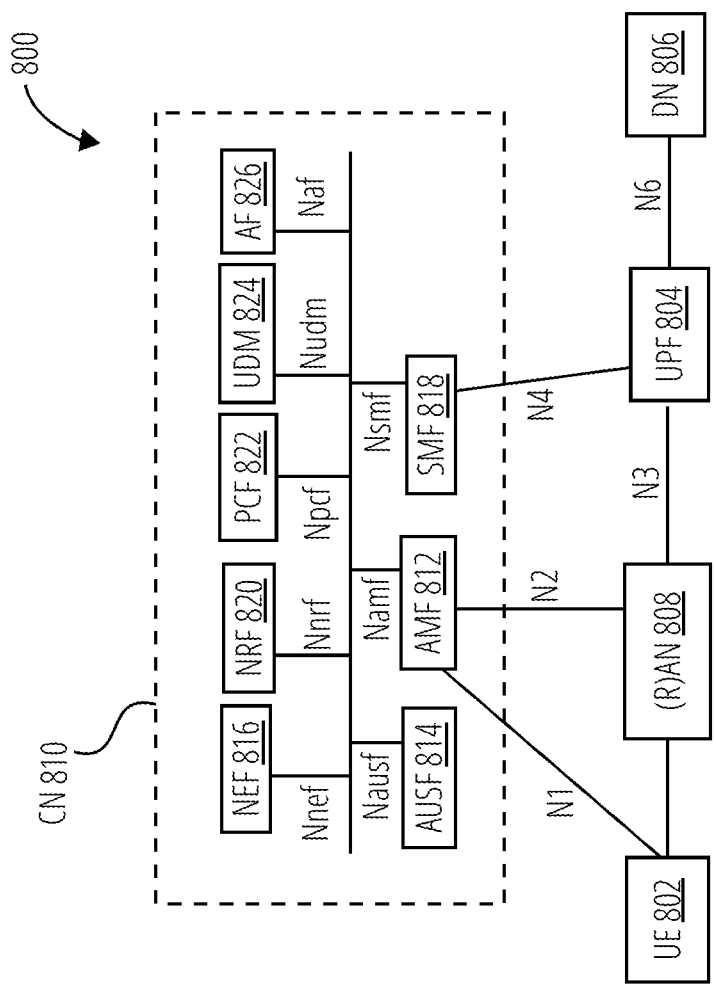
FIG. 8 illustrates a system in accordance with one embodiment.

FIG. 8 illustrates an architecture of a system 800 of a network in accordance with some embodiments. The system 800 is shown to include a UE 802, which may be the same or similar to the UE 702 and the UE 704 discussed previously; a 5G access node or RAN node (shown as (R)AN node 808), which may be the same or similar to the macro RAN node 718 and/or the LP RAN node 720 discussed previously; a User Plane Function (shown as UPF 804); a Data Network (DN 806), which may be, for example, operator services, Internet access or 3rd party services; and a 5G Core Network (5GC) (shown as CN 810).

The CN 810 may include an Authentication Server Function (AUSF 814); a Core Access and Mobility Management Function (AMF 812); a Session Management Function (SMF 818); a Network Exposure Function (NEF 816); a Policy Control Function (PCF 822); a Network Function (NF) Repository Function (NRF 820); a Unified Data Management (UDM 824); and an Application Function (AF 826). The CN 810 may also include other elements that are not shown, such as a Structured Data Storage network function (SDSF), an Unstructured Data Storage network function (UDSF), and the like.

The UPF 804 may act as an anchor point for intra-RAT and inter-RAT mobility, an external PDU session point of interconnect to DN 806, and a branching point to support multi-homed PDU session. The UPF 804 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 804 may include an uplink classifier to support routing traffic flows to a data network. The DN 806 may represent various network operator services, Internet access, or third party services. DN 806 may include, or be similar to the application server 742 discussed previously.

The AUSF 814 may store data for authentication of UE 802 and handle authentication related functionality. The AUSF 814 may facilitate a common authentication framework for various access types.

The AMF 812 may be responsible for registration management (e.g., for registering UE 802, etc.), connection management, reachability management, mobility management, and lawful interception of AMF-related events, and access authentication and authorization. AMF 812 may provide transport for SM messages for the SMF 818, and act as a transparent proxy for routing SM messages. AMF 812 may also provide transport for short message service (SMS) messages between UE 802 and an SMS function (SMSF) (not shown by FIG. 8). AMF 812 may act as Security Anchor Function (SEA), which may include interaction with the AUSF 814 and the UE 802, receipt of an intermediate key that was established as a result of the UE 802 authentication process. Where USIM based authentication is used, the AMF 812 may retrieve the security material from the AUSF 814. AMF 812 may also include a Security Context Management (SCM) function, which receives a key from the SEA that it uses to derive access-network specific keys. Furthermore, AMF 812 may be a termination point of RAN CP interface (N2 reference point), a termination point of NAS (NI) signaling, and perform NAS ciphering and integrity protection.

AMF 812 may also support NAS signaling with a UE 802 over an N3 interworking-function (IWF) interface. The N3IWF may be used to provide access to untrustedentities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 802 and AMF 812, and relay uplink and downlink user-plane packets between the UE 802 and UPF 804. The N3IWF also provides mechanisms for IPsec tunnel establishment with the UE 802.

The SMF 818 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 818 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 816 may provide means for securely exposing the services and capabilities provided by 3GPP network functions for third party, internal exposure/re-exposure, Application Functions (e.g., AF 826), edge computing or fog computing systems, etc. In such embodiments, the NEF 816 may authenticate, authorize, and/or throttle the AFs. NEF 816 may also translate information exchanged with the AF 826 and information exchanged with internal network functions. For example, the NEF 816 may translate between an AF-Service-Identifier and an internal 5GC information. NEF 816 may also receive information from other network functions (NFs) based on exposed capabilities of other network functions. This information may be stored at the NEF 816 as structured data, or at a data storage NF using a standardized interfaces. The stored information can then be re-exposed by the NEF 816 to other NFs and AFs, and/or used for other purposes such as analytics.

The NRF 820 may support service discovery functions, receive NF Discovery Requests from NF instances, and provide the information of the discovered NF instances to the NF instances. NRF 820 also maintains information of available NF instances and their supported services.

The PCF 822 may provide policy rules to control plane function(s) to enforce them, and may also support unified policy framework to govern network behavior. The PCF 822 may also implement a front end (FE) to access subscription information relevant for policy decisions in a UDR of UDM 824.

The UDM 824 may handle subscription-related information to support the network entities' handling of communication sessions, and may store subscription data of UE 802. The UDM 824 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 822. UDM 824 may also support SMS management, wherein an SMS-FE implements the similar application logic as discussed previously.

The AF 826 may provide application influence on traffic routing, access to the Network Capability Exposure (NCE), and interact with the policy framework for policy control. The NCE may be a mechanism that allows the 5GC and AF 826 to provide information to each other via NEF 816, which may be used for edge computing implementations. In such implementations, the network operator and third party services may be hosted close to the UE 802 access point of attachment to achieve an efficient service delivery through the reduced end-to-end latency and load on the transport network. For edge computing implementations, the 5GC may select a UPF 804 close to the UE 802 and execute traffic steering from the UPF 804 to DN 806 via the N6 interface. This may be based on the UE subscription data, UE location, and information provided by the AF 826. In this way, the AF 826 may influence UPF (re)selection and traffic routing. Based on operator deployment, when AF 826 is considered to be a trusted entity, the network operator may permit AF 826 to interact directly with relevant NFs.

As discussed previously, the CN 810 may include an SMSF, which may be responsible for SMS subscription checking and verification, and relaying SM messages to/from the UE 802 to/from other entities, such as an SMS-GMSC/IWMSC/SMS-router. The SMS may also interact with AMF 812 and UDM 824 for notification procedure that the UE 802 is available for SMS transfer (e.g., set a UE not reachable flag, and notifying UDM 824 when UE 802 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 810 may include an Nx interface, which is an inter-CN interface between the MME (e.g., MME(s) 730) and the AMF 812 in order to enable interworking between CN 810 and CN 728.

Although not shown by FIG. 8, the system 800 may include multiple RAN nodes (such as (R)AN node 808) wherein an Xn interface is defined between two or more (R)AN node 808 (e.g., gNBs and the like) that connecting to 5GC 410, between a (R)AN node 808 (e.g., gNB) connecting to CN 810 and an eNB (e.g., a macro RAN node 718 of FIG. 7), and/or between two eNBs connecting to CN 810.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 802 in a connected mode (e.g., CM-CONNECTED) including functionality to manage the UE mobility for connected mode between one or more (R)AN node 808. The mobility support may include context transfer from an old (source) serving (R)AN node 808 to new (target) serving (R)AN node 808; and control of user plane tunnels between old (source) serving (R)AN node 808 to new (target) serving (R)AN node 808.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
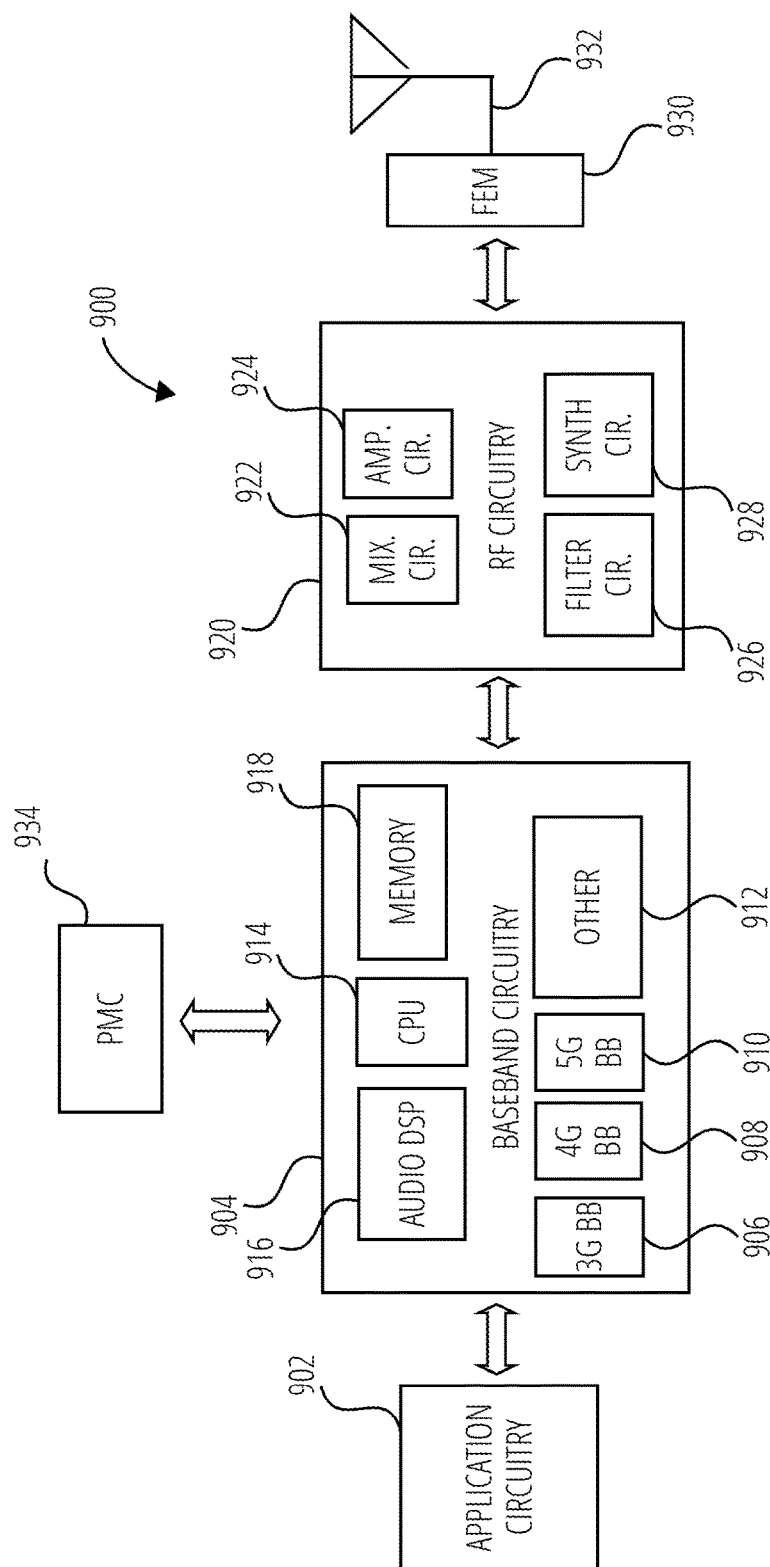
FIG. 9 illustrates a device in accordance with one embodiment.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing Unit (CPU 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
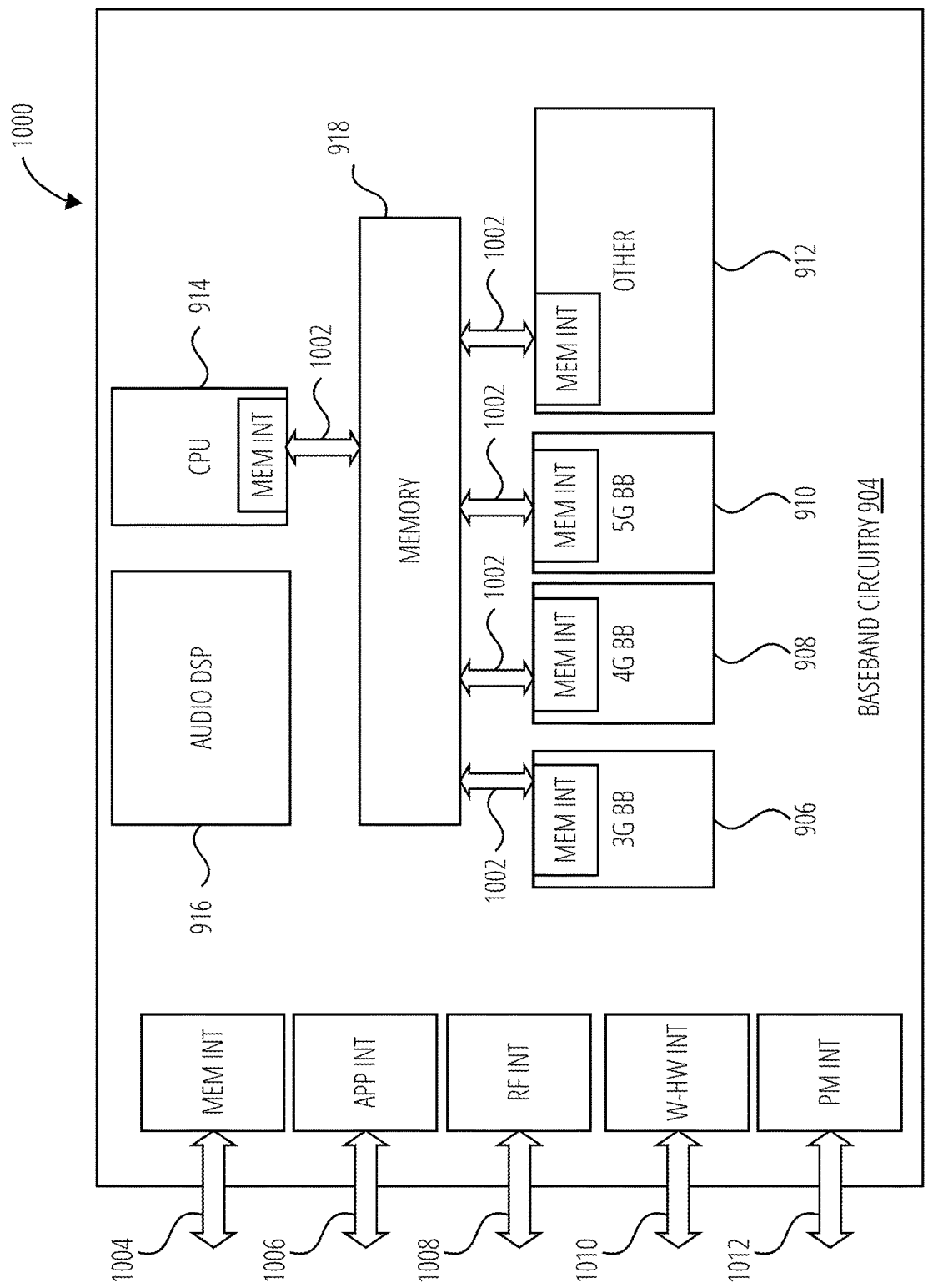
FIG. 10 illustrates an example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
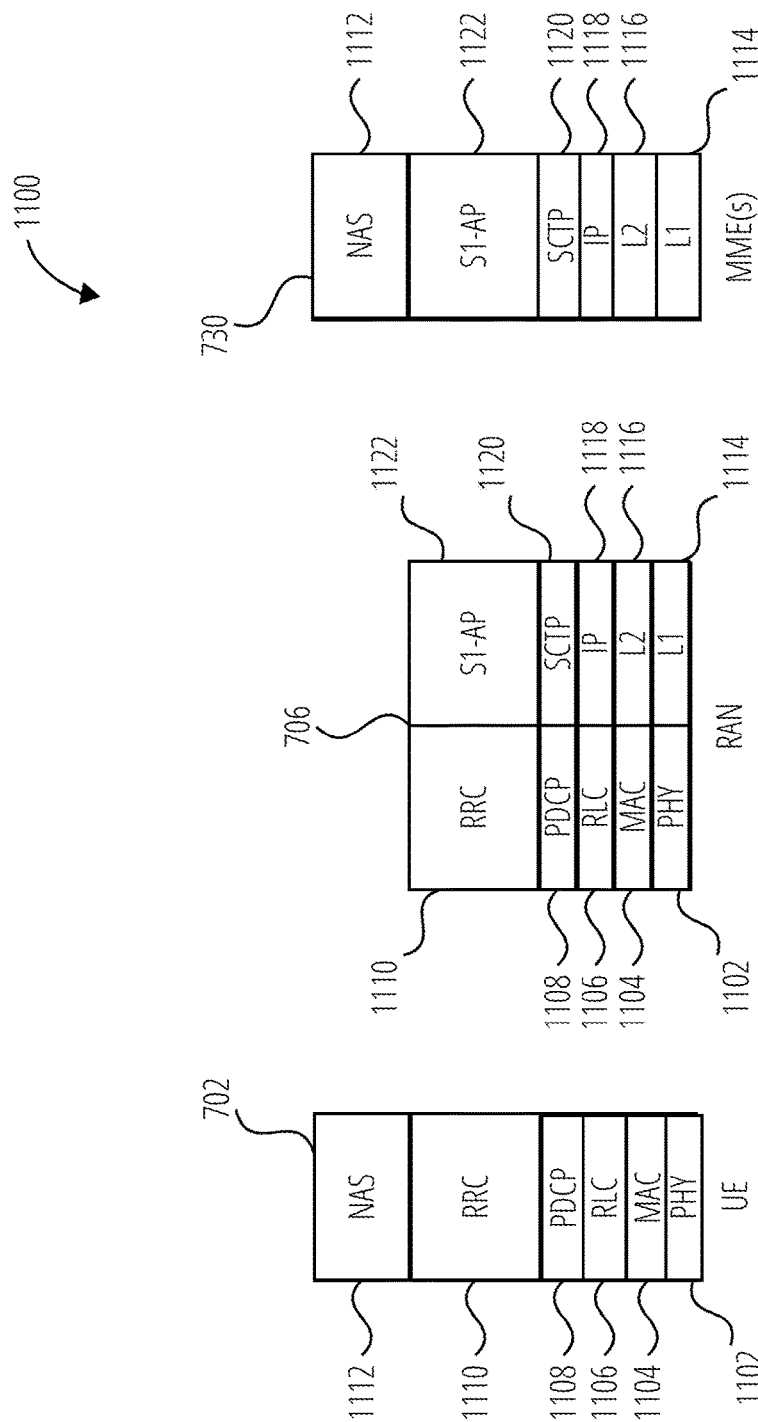
FIG. 11 illustrates a control plane in accordance with one embodiment.

FIG. 11 is an illustration of a control plane protocol stack in accordance with some embodiments. In this embodiment, a control plane 1100 is shown as a communications protocol stack between the UE 702 (or alternatively, the UE 704), the RAN 706 (e.g., the macro RAN node 718 and/or the LP RAN node 720), and the MME(s) 730.

A PHY layer 1102 may transmit or receive information used by the MAC layer 1104 over one or more air interfaces. The PHY layer 1102 may further perform link adaptation or adaptive modulation and coding (AMC), power control, cell search (e.g., for initial synchronization and handover purposes), and other measurements used by higher layers, such as an RRC layer 1110. The PHY layer 1102 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1104 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 1106 may operate in a plurality of modes of operation, including: Transparent Mode (TM), Unacknowledged Mode (UM), and Acknowledged Mode (AM). The RLC layer 1106 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1106 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1108 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1110 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 702 and the RAN 706 may utilize a Uu interface (e.g., an LTE-Uu interface) to exchange control plane data via a protocol stack comprising the PHY layer 1102, the MAC layer 1104, the RLC layer 1106, the PDCP layer 1108, and the RRC layer 1110.

In the embodiment shown, the non-access stratum (NAS) protocols (NAS protocols 1112) form the highest stratum of the control plane between the UE 702 and the MME(s) 730. The NAS protocols 1112 support the mobility of the UE 702 and the session management procedures to establish and maintain IP connectivity between the UE 702 and the P-GW 734.

The S1 Application Protocol (S1-AP) layer (S1-AP layer 1122) may support the functions of the S1 interface and comprise Elementary Procedures (EPs). An EP is a unit of interaction between the RAN 706 and the CN 728. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 1120) may ensure reliable delivery of signaling messages between the RAN 706 and the MME(s) 730 based, in part, on the IP protocol, supported by an IP layer 1118. An L2 layer 1116 and an L1 layer 1114 may refer to communication links (e.g., wired or wireless) used by the RAN node and the MME to exchange information.

The RAN 706 and the MME(s) 730 may utilize an S1-MME interface to exchange control plane data via a protocol stack comprising the L1 layer 1114, the L2 layer 1116, the IP layer 1118, the SCTP layer 1120, and the S1-AP layer 1122.

Figure 12:
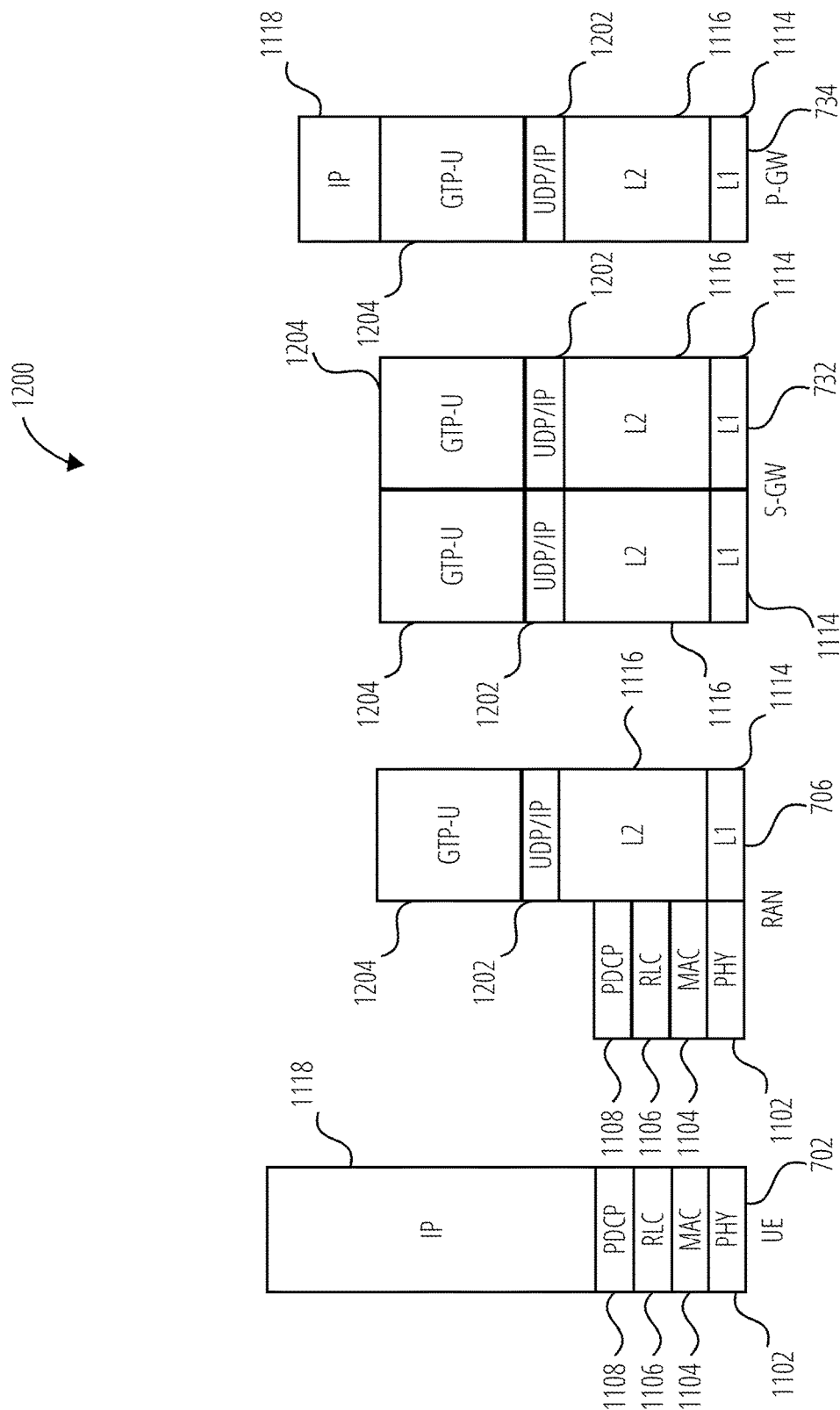
FIG. 12 illustrates a user plane in accordance with one embodiment.

FIG. 12 is an illustration of a user plane protocol stack in accordance with some embodiments. In this embodiment, a user plane 1200 is shown as a communications protocol stack between the UE 702 (or alternatively, the UE 704), the RAN 706 (e.g., the macro RAN node 718 and/or the LP RAN node 720), the S-GW 732, and the P-GW 734. The user plane 1200 may utilize at least some of the same protocol layers as the control plane 1100. For example, the UE 702 and the RAN 706 may utilize a Uu interface (e.g., an LTE-Uu interface) to exchange user plane data via a protocol stack comprising the PHY layer 1102, the MAC layer 1104, the RLC layer 1106, the PDCP layer 1108.

The General Packet Radio Service (GPRS) Tunneling Protocol for the user plane (GTP-U) layer (GTP-U layer 1204) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1202) may provide checksums for data integrity, port numbers for addressing different functions at the source and destination, and encryption and authentication on the selected data flows. The RAN 706 and the S-GW 732 may utilize an S1-U interface to exchange user plane data via a protocol stack comprising the L1 layer 1114, the L2 layer 1116, the UDP/IP layer 1202, and the GTP-U layer 1204. The S-GW 732 and the P-GW 734 may utilize an S5/S8a interface to exchange user plane data via a protocol stack comprising the L1 layer 1114, the L2 layer 1116, the UDP/IP layer 1202, and the GTP-U layer 1204. As discussed above with respect to FIG. 11, NAS protocols support the mobility of the UE 702 and the session management procedures to establish and maintain IP connectivity between the UE 702 and the P-GW 734.

Figure 13:
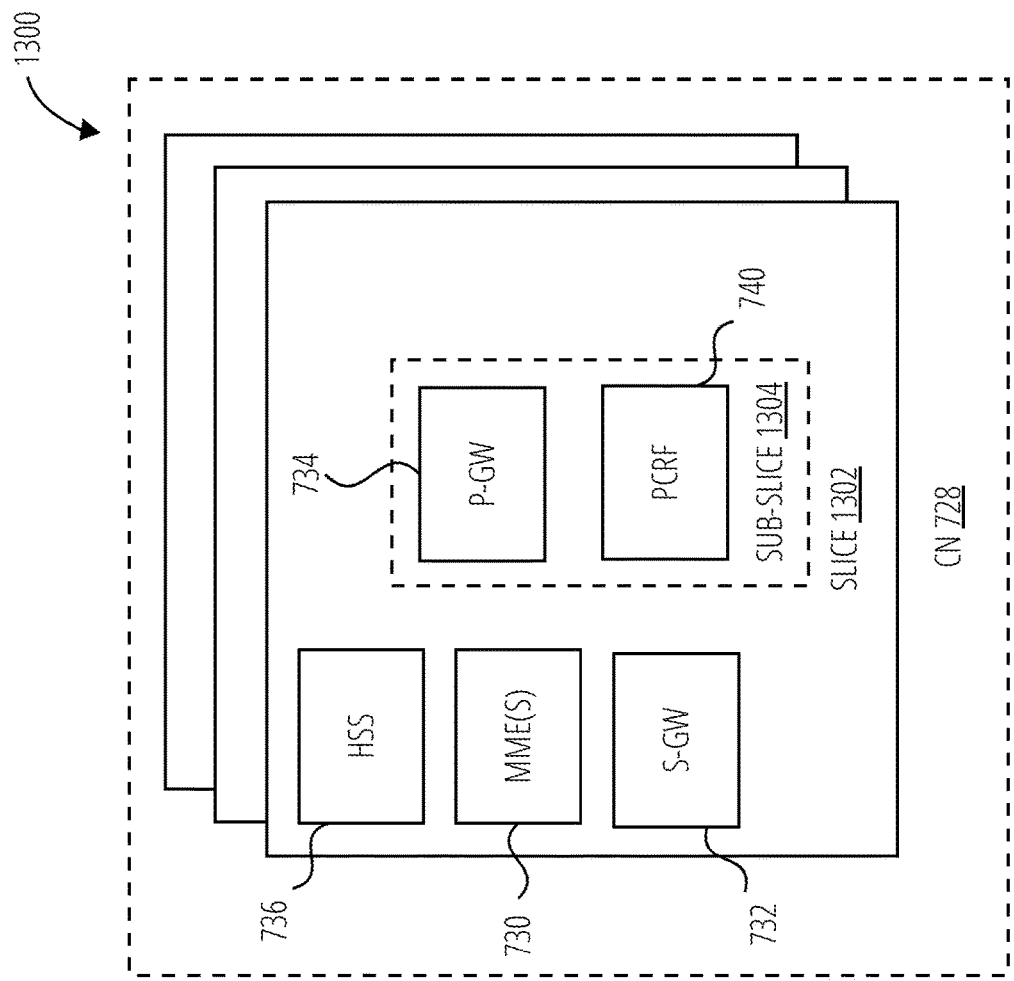
FIG. 13 illustrates a components in accordance with one embodiment.

FIG. 13 illustrates components 1300 of a core network in accordance with some embodiments. The components of the CN 728 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 728 may be referred to as a network slice 1302 (e.g., the network slice 1302 is shown to include the HSS 736, that MME(s) 730, and the S-GW 732). A logical instantiation of a portion of the CN 728 may be referred to as a network sub-slice 1304 (e.g., the network sub-slice 1304 is shown to include the P-GW 734 and the PCRF 740).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 14:
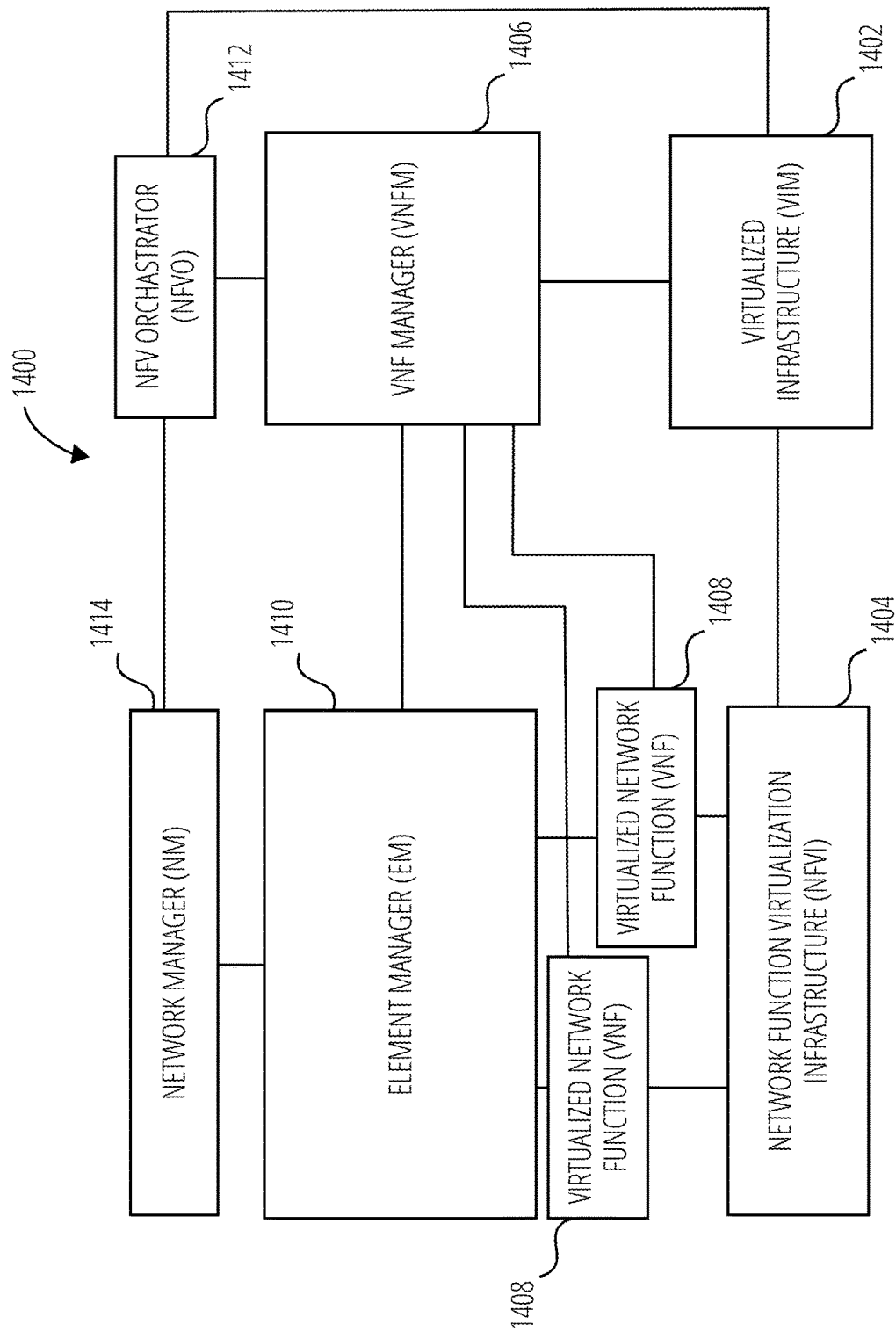
FIG. 14 illustrates a system in accordance with one embodiment.

FIG. 14 is a block diagram illustrating components, according to some example embodiments, of a system 1400 to support NFV. The system 1400 is illustrated as including a virtualized infrastructure manager (shown as VIM 1402), a network function virtualization infrastructure (shown as NFVI 1404), a VNF manager (shown as VNFM 1406), virtualized network functions (shown as VNF 1408), an element manager (shown as EM 1410), an NFV Orchestrator (shown as NFVO 1412), and a network manager (shown as NM 1414).

The VIM 1402 manages the resources of the NFVI 1404. The NFVI 1404 can include physical or virtual resources and applications (including hypervisors) used to execute the system 1400. The VIM 1402 may manage the life cycle of virtual resources with the NFVI 1404 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1406 may manage the VNF 1408. The VNF 1408 may be used to execute EPC components/functions. The VNFM 1406 may manage the life cycle of the VNF 1408 and track performance, fault and security of the virtual aspects of VNF 1408. The EM 1410 may track the performance, fault and security of the functional aspects of VNF 1408. The tracking data from the VNFM 1406 and the EM 1410 may comprise, for example, performance measurement (PM) data used by the VIM 1402 or the NFVI 1404. Both the VNFM 1406 and the EM 1410 can scale up/down the quantity of VNFs of the system 1400.

The NFVO 1412 may coordinate, authorize, release and engage resources of the NFVI 1404 in order to provide the requested service (e.g., to execute an EPC function, component, or slice). The NM 1414 may provide a package of end-user functions with the responsibility for the management of a network, which may include network elements with VNFs, non-virtualized network functions, or both (management of the VNFs may occur via the EM 1410).

Figure 15:
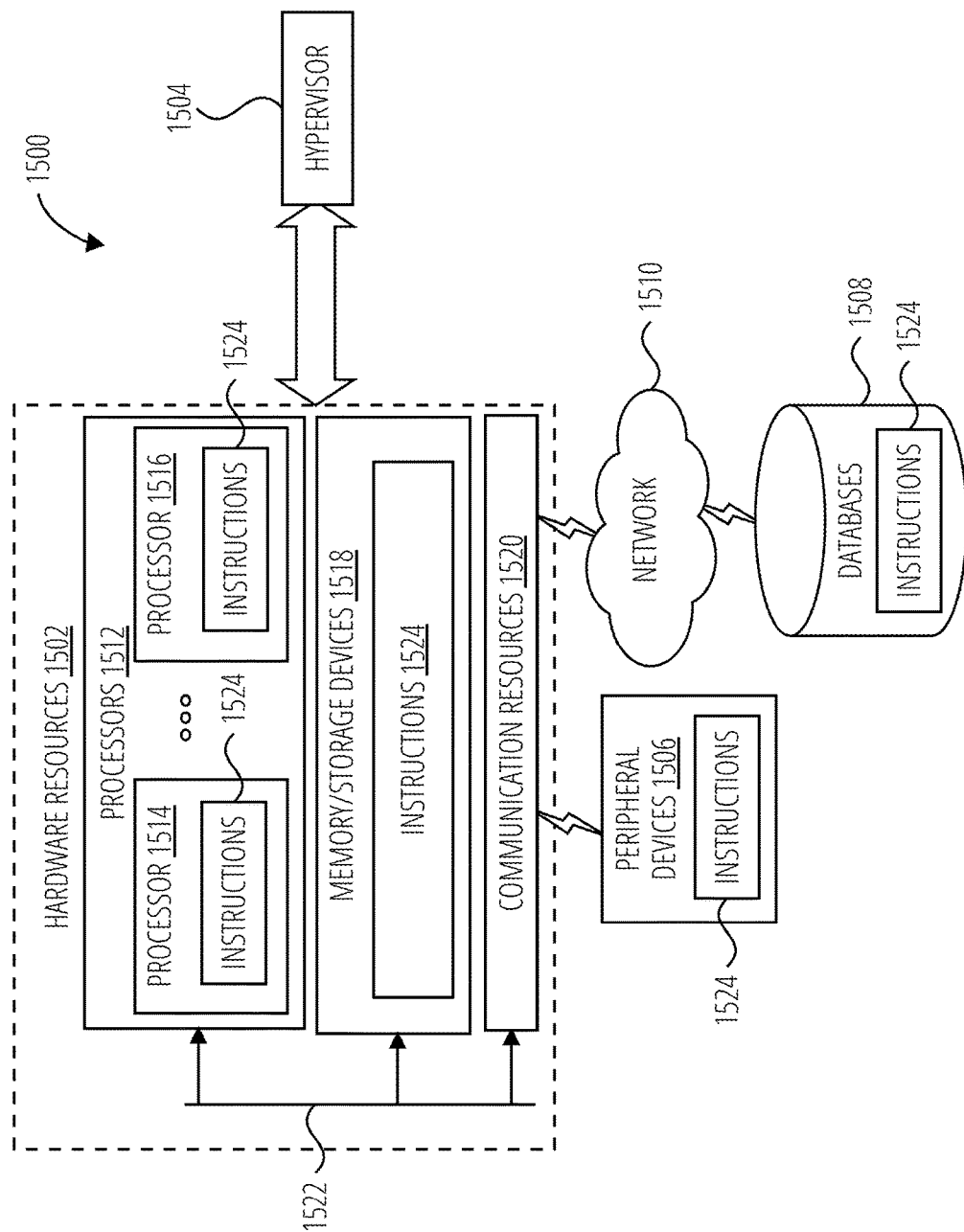
FIG. 15 illustrates a components in accordance with one embodiment.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1512 (or processor cores), one or more memory/storage devices 1518, and one or more communication resources 1520, each of which may be communicatively coupled via a bus 1522. For embodiments where node virtualization (e.g., NFV) is utilized, a hypervisor 1504 may be executed to provide an execution environment for one or more network slices/sub-slices to utilize the hardware resources 1502.

The processors 1512 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1514 and a processor 1516.

The memory/storage devices 1518 may include main memory, disk storage, or any suitable combination thereof. The memory/storage devices 1518 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1520 may include interconnection or network interface components or other suitable devices to communicate with one or more peripheral devices 1506 or one or more databases 1508 via a network 1510. For example, the communication resources 1520 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1524 may comprise software, a program, an application, an applet, an app, or other executable code for causing at least any of the processors 1512 to perform any one or more of the methodologies discussed herein. The instructions 1524 may reside, completely or partially, within at least one of the processors 1512 (e.g., within the processor's cache memory), the memory/storage devices 1518, or any suitable combination thereof. Furthermore, any portion of the instructions 1524 may be transferred to the hardware resources 1502 from any combination of the peripheral devices 1506 or the databases 1508. Accordingly, the memory of the processors 1512, the memory/storage devices 1518, the peripheral devices 1506, and the databases 1508 are examples of computer-readable and machine-readable media.

H. Further Examples

The following examples pertain to further embodiments.

Example 1A is a method for a service producer in a wireless network to provide performance management related service for one or more network function (NF). The method include receiving a measurement job creation request, from an authorized consumer, to create a measurement job to collect performance data of the one or more NF; and in response to the measurement job creation request, requesting the one or more NF to collect the performance data, wherein the measurement job creation request indicates whether the performance data is to be reported by performance data file or by performance data streaming.

Example 2A includes the method of Example 1A, further comprising, in response to creation of the measurement job for the one or more NF, generating the performance data for the measurement job.

Example 3A is the method of Example 1A, wherein the service producer comprises a network function management function (NFMF) in the wireless network.

Example 4A is the method of Example 3A, wherein the NFMF comprises a network function performance management function (NFPMF).

Example 5A is the method of Example 1A, wherein the service producer comprises an NF measurement job control service producer.

Example 6A is the method of Example 1A, further comprising: receiving a query, from the authorized consumer, to report information about one or more ongoing NF measurement job corresponding to the authorized consumer; and in response to the query, providing the information about the one or more ongoing NF measurement job to the authorized consumer.

Example 7A is the method of Example 1A, further comprising: if the measurement job creation request indicates that the performance data is to be reported by the performance data file, sending a performance data file ready notification to the authorized consumer; and if the measurement job creation request indicates that the performance data is to be reported by the performance data streaming, sending a performance data stream to the authorized consumer. In certain embodiments, the method of Example 1A may be performed by a first apparatus and the method of Example 7A may be performed by a second apparatus.

Example 8A is a method for a network slice subnet instance (NSSI) measurement job control service. The method includes: receiving a request to create an NSSI measurement job to collect performance data of one or more NSSI; decomposing the performance data of the one or more NSSI into performance data types of constituent NSSIs and/or network functions (NFs); determining whether the performance data types of the constituent NSSI(s) and/or NFs can be collected by existing measurement jobs, if any, for the constituent NSSI(s) and/or NFs; and in response to determining that the performance data types cannot be collected by the existing measurement jobs for the constituent NSSI(s) and/or NFs, creating one or more new measurement jobs for the constituent NSSI(s) and/or NFs, respectively.

Example 9A is the method of Example 8A, wherein creating the one or more new measurement jobs comprises: requesting the respective constituent NSSIs and/or NFs to collect the performance data, wherein the request indicates whether the performance data is to be reported by performance data file or by performance data streaming.

Example 10A is the method of Example 8A, wherein the method is performed by a service producer configured to provide a performance management service for NSSI.

Example 11A is the method of Example 10A, wherein the service producer comprises a network function performance management function (NFPMF) or a network function (NF).

Example 12A is the method of Example 10A, wherein the service producer comprises an NSSI measurement job control service producer.

Example 13A is the method of Example 8A, further comprising: receiving a query, from an authorized consumer, to report information about one or more ongoing NSSI measurement job corresponding to the authorized consumer; and in response to the query, providing the information about the one or more ongoing NSSI measurement job to the authorized consumer.

Example 14A is the method of Example 8A, further comprising one of: sending an NSSI performance data file ready notification to an authorized consumer; or sending an NSSI performance data stream to the authorized consumer. In certain embodiments, the method of Example 8A may be performed by a first apparatus and the method of Example 14A may be performed by a second apparatus.

Example 15A is a method for a service producer to provide performance management (PM) service for a network slice, the method comprising: receiving a request, from an authorized consumer, to create a network slice instance (NSI) measurement job to collect performance data of one or more NSI, wherein the request indicates whether the performance data is to be reported by performance data file or by performance data streaming; decomposing the performance data of the one or more NSI into performance data types of constituent network slice subnet instances (NSSIs) and/or constituent network functions (NFs); and creating a new measurement job for at least one of the constituent NSSI(s) or the constituent NF(s).

Example 16A is the method of Example 15A, wherein creating the new measurement job comprises: determining whether decomposed performance data of the constituent NSSI(s) can be collected by existing measurement job(s) for NSSI(s); and in response to determining that the decomposed performance data of the constituent NSSI(s) cannot be collected by the existing measurement job(s) for NSSI(s), creating the new measurement job for the constituent NSSI (s).

Example 17A is the method of Example 15A, wherein creating the new measurement job comprises: determining whether decomposed performance data of the constituent NF(s) can be collected by existing measurement job(s) for NF(s); and in response to determining that the decomposed performance data of the constituent NF(s) cannot be collected by the existing measurement job(s) for NF(s), requesting an NF PM service producer to create the new measurement job for the constituent NF(s).

Example 18A is the method of Example 15A, wherein receiving the request comprises receiving an NSI measurement job creation request from the authorized consumer.

Example 19A is the method of Example 15A, wherein the service producer comprises a network slice management function (NSMF).

Example 20A is the method of Example 15A, wherein the service producer comprises an NSI measurement job control service producer.

Example 21A is the method of Example 15A, further comprising: receiving a query, from the authorized consumer, to report information about one or more ongoing NSI measurement job corresponding to the authorized consumer; and in response to the query, providing the information about the one or more ongoing NSI measurement job to the authorized consumer.

Example 22A is the method of Example 15A, further comprising: if the request to create the NSI measurement job indicates that the performance data is to be reported by the performance data file, sending a performance data file ready notification to the authorized consumer; and if the request to create the NSI measurement job indicates that the performance data is to be reported by the performance data streaming, sending a performance data stream to the authorized consumer. In certain embodiments, the method of Example 15A may be performed by a first apparatus and the method of Example 22A may be performed by a second apparatus.

Example 23A is a method to create a measurement job for collecting network or sub-network performance data that are not specific to network slicing, the method comprising: receiving a request, from an authorized consumer, to create a measurement job for collecting non-slice-specific network performance data, wherein the request indicates whether the performance data is to be reported by performance data file or by performance data streaming; decomposing non-slice-specific network performance data into performance data types of constituent network functions (NFs); determining whether the performance data types of the constituent NF(s) can be collected by existing measurement jobs for NF(s); and requesting to create one or more new measurement job for the constituent NF(s).

Example 24A is the method of Example 23A, wherein the method is performed by a network performance management function (NPMF).

Example 25A is the method of Example 23A, wherein the method is performed by a network measurement job control service producer, and wherein requesting to create the one or more new measurement job for the constituent NF(s) comprises requesting an NF measurement job control service producer to create the one or more new measurement job.

Example 26A is the method of Example 25A, wherein to create the one or more new measurement jobs comprises requesting the constituent NF(s) to collect the performance data.

Example 27A is the method of Example 23A, further comprising: receiving a query, from the authorized consumer, to report information about ongoing measurement jobs to collect network or sub-network performance data that are not specific to network slicing; and in response to the query, providing the information about the ongoing measurement jobs to the authorized consumer.

Example 28A is the method of Example 23A, further comprising: if the request to create the measurement job for collecting the non-slice-specific network performance data indicates that the performance data is to be reported by the performance data file, sending a performance data file ready notification to the authorized consumer; and if the request to create a measurement job for collecting the non-slice-specific network performance data indicates that the performance data is to be reported by the performance data streaming, sending a performance data stream to the authorized consumer. In certain embodiments, the method of Example 23A may be performed by a first apparatus and the method of Example 28A may be performed by a second apparatus.

Example 29A is an apparatus for a service producer in a wireless network to provide performance management related service for one or more network function (NF), the apparatus comprising: a memory interface to send or receive, to or from a memory device, a measurement job creation request from an authorized consumer; and a processor to: process the measurement job creation request from the an authorized consumer, the measurement job creation request to create a measurement job to collect performance data of the one or more NF; and in response to the measurement job creation request, generate a request for the one or more NF to collect the performance data, wherein the measurement job creation request indicates whether the performance data is to be reported by performance data file or by performance data streaming.

Example 30A is a non-transitory computer-readable storage medium, the computer-readable storage medium including instructions that when executed by a computer, cause the computer to: receive a measurement job creation request, from an authorized consumer, to create a measurement job to collect performance data of the one or more NF; and in response to the measurement job creation request, request the one or more NF to collect the performance data, wherein the measurement job creation request indicates whether the performance data is to be reported by performance data file or by performance data streaming.

Example 31A is an apparatus for a network slice subnet instance (NSSI) measurement job control service, the apparatus comprising: a memory interface to send or receive, to or from a memory device, a request to create an NSSI measurement job; and a processor to: the request to create the NSSI measurement job, the request to collect performance data of one or more NSSI; decompose the performance data of the one or more NSSI into performance data types of constituent NSSIs and/or network functions (NFs); determine whether the performance data types of the constituent NSSI(s) and/or NFs can be collected by existing measurement jobs, if any, for the constituent NSSI(s) and/or NFs; and in response to determining that the performance data types cannot be collected by the existing measurement jobs for the constituent NSSI(s) and/or NFs, create one or more new measurement jobs for the constituent NSSI(s) and/or NFs, respectively.

Example 32A is a computing apparatus, the computing apparatus comprising a processor and a memory storing instructions. The processor and the memory storing instructions that, when executed by the processor, configure the apparatus to: receive a request to create an NSSI measurement job to collect performance data of one or more NSSI; decompose the performance data of the one or more NSSI into performance data types of constituent NSSIs and/or network functions (NFs); determine whether the performance data types of the constituent NSSI(s) and/or NFs can be collected by existing measurement jobs, if any, for the constituent NSSI(s) and/or NFs; and in response to determining that the performance data types cannot be collected by the existing measurement jobs for the constituent NSSI(s) and/or NFs, create one or more new measurement jobs for the constituent NSSI(s) and/or NFs, respectively.

Example 33A is an apparatus for a service producer to provide performance management (PM) service for a network slice, the computing apparatus comprising a memory interface and a processor. The memory interface to send or receive, to or from a memory device, a request from an authorized consumer to create a network slice instance (NSI) measurement job. The processor to: process the request, from the authorized consumer, the request to create a network slice instance (NSI) measurement job to collect performance data of one or more NSI, wherein the request indicates whether the performance data is to be reported by performance data file or by performance data streaming; decompose the performance data of the one or more NSI into performance data types of constituent network slice subnet instances (NSSIs) and/or constituent network functions (NFs); and create a new measurement job for at least one of the constituent NSSI(s) or the constituent NF(s).

Example 34A is a computing apparatus, the computing apparatus comprising a processor and a memory storing instructions. The processor and the memory storing instructions that, when executed by the processor, configure the apparatus to: receive a request, from an authorized consumer, to create a network slice instance (NSI) measurement job to collect performance data of one or more NSI, wherein the request indicates whether the performance data is to be reported by performance data file or by performance data streaming; decompose the performance data of the one or more NSI into performance data types of constituent network slice subnet instances (NSSIs) and/or constituent network functions (NFs); and create a new measurement job for at least one of the constituent NSSI(s) or the constituent NF(s).

Example 35A is an apparatus to create a measurement job for collecting network or sub-network performance data that are not specific to network slicing, the apparatus comprising a memory interface and a processor. The memory interface to send or receive, to or from a memory device, a request from an authorized consumer to create a measurement job. The processor to: process the request, from the authorized consumer, the request to create a measurement job for collecting non-slice-specific network performance data, wherein the request indicates whether the performance data is to be reported by performance data file or by performance data streaming; decompose non-slice-specific network performance data into performance data types of constituent network functions (NFs); determine whether the performance data types of the constituent NF(s) can be collected by existing measurement jobs for NF(s); and request to create one or more new measurement job for the constituent NF(s).

Example 36A is a computing apparatus, the computing apparatus comprising a processor and a memory storing instructions. The processor and the memory storing instructions that, when executed by the processor, configure the apparatus to: receive a request, from an authorized consumer, to create a measurement job for collecting non-slice-specific network performance data, wherein the request indicates whether the performance data is to be reported by performance data file or by performance data streaming; decompose non-slice-specific network performance data into performance data types of constituent network functions (NFs); determine whether the performance data types of the constituent NF(s) can be collected by existing measurement jobs for NF(s); and request to create one or more new measurement job for the constituent NF(s).

Example 37A is a computing apparatus including a processor and a memory storing instructions that, when executed by the processor, configure the apparatus to perform the method of any of Examples 1A-28A.

Example 38A is a non-transitory computer-readable storage medium including instructions that, when processed by a computer, configure the computer to perform the method of any of Examples 1A-28A.

Example 39A is an apparatus comprising means to perform the method of any of Examples 1A-28A.

Example 1B may include a service producer to provide Performance Management (PM) service for NF, the service producer configured to: receive a request for creating measurement job for NF from an authorized consumer; create the measurement job on the NF; and respond the measurement job creation request to the authorized consumer.

Example 2B may include the subject matter of Example 1B or some other example herein, wherein the service producer is NF PM Function (NFPMF) or NF.

Example 3B may include the subject matter of Examples 1B and 2B or some other example herein, wherein creating the measurement job on the NF includes sending the measurement job creation request to NF, in case the service producer is not NF.

Example 4B may include the subject matter of Examples 1B to 3B or some other example herein, wherein the measurement job is to collect the performance data of NF.

Example 5B may include the subject matter of Examples 1B to 4B or some other example herein, wherein the NF reports the performance data of NF to a data repository.

Example 6B may include a data repository to provide the NF performance data service, the data repository configured to: get the performance data of NF; store the performance data of NF; and/or report the performance data of NF to the authorized consumer.

Example 7B may include the subject matter of Example 6B or some other example herein, wherein the service producer is NF performance data repository (NFPDR).

Example 8B may include a service producer to provide Performance Management (PM) service for Network Slice SubNet, the service producer configured to: receive a request for creating measurement job for Network Slice SubNet Instance (NSSI) from an authorized consumer; decompose the performance data of NSSI to performance data of NF(s); check whether the decomposed performance data of NF(s) can be collected by the existing measurement job(s) for NF(s); request to create measurement job(s) for NF(s) via the service producer providing the PM service for NFs (as described in Example 1B to 5B), if needed; receive response for the request of creating measurement job(s) for NF(s); respond the request of creating measurement job for NSSI to the authorized consumer; get the performance data of NF(s) from the data repository of Examples 6B and 7B and/or some other examples herein; store the performance data of NFs; generate the performance data for the NSSI based on the performance data of NF(s); and report the performance data of the NSSI to a data repository storing the performance data of NSSIs. Example 9B may include the subject matter of example 8 or some other example herein, wherein the service producer providing Performance Management (PM) service for Network Slice SubNet is NSSMF (Network Slice SubNet Management Function).

Example 10B may include a service producer to provide Performance Management (PM) service for Network Slice, by: receive a request for creating measurement job for Network Slice Instance (NSI) from an authorized consumer; decompose the performance data of NSI to performance data of NSSI(s); check whether the decomposed performance data of NSSI(s) can be collected by the existing measurement job(s) for NSSI(s); request to create measurement job(s) for NSSI(s) via the service producer providing the PM service for Network Slice SubNet (as described in Examples 8B to 9B), if needed; receive response for the request of creating measurement job(s) for NSSI(s); and/or decompose the performance data of NSI to performance data of NF(s); check whether the decomposed performance data of NF(s) can be collected by the existing measurement job(s) for NF(s); request to create measurement job(s) for NF(s) via the service producer providing the PM service for NFs (as described in Example 1B to 5B), if needed; receive response for the request of creating measurement job(s) for NF(s); respond the request of creating measurement job for NSI to the authorized consumer; get the performance data of NSSI (s) from a data repository storing the performance data of NSSIs; get the performance data of NF(s) from a data repository (as described in Example 6B and 7B) storing the performance data of NFs; generate the performance data for the NSI based on the performance data of NSSI(s) and/or performance data of NF(s); and report the performance data of the NSI to a data repository storing the performance data of NSIs.

Example 11B may include the subject matter of Example 10B or some other example herein, wherein the service producer providing Performance Management (PM) service for Network Slice is NSMF (Network Slice Management Function).

Example 12B may include a service producer to provide Performance Management (PM) service for non-slice specific network, the service producer configured to: receive a request for creating measurement job for a non-slice-specific network from an authorized consumer; decompose the performance data of non-slice-specific network to performance data of NF(s); check whether the decomposed performance data of NF can be collected by the existing measurement job(s) for NF(s); request to create measurement job(s) for NF(s) via the service producer providing the PM service for NFs (as described in Example 1B to 5B), if needed; receive response for the request of creating measurement job(s) for NF(s); respond the request of creating measurement job for non-slice-specific network to the authorized consumer; get the performance data of NF(s) from a data repository (as described in Example 6B and 7B) storing the performance data of NFs; generate the performance data for the non-slice-specific network based on the performance data of NF(s); and report the performance data of the non-slice-specific network to a data repository storing the performance data of non-slice-specific networks.

Example 13B may include the subject matter of Example 12B or some other example herein, wherein the service producer providing Performance Management (PM) service for non-slice-specific network is Network Performance Management Function (NPMF).

Example 14B may include a data repository to provide a network performance data service, the data repository configured to: get the performance data of network; store the performance data of the network; and/or report the performance data of the network to the authorized consumer.

Example 15B may include the subject matter of Example 14B or some other example herein, wherein the network is a NSSI, NSI or a non-slice specific network.

Example 16B may include the subject matter of Examples 14B and 15B or some other example herein, wherein the data repository is Network performance data repository (NWPDR or NPDR).

Example 17B may include the subject matter of Example 1B to Example 16B or some other example herein, wherein the performance data is periodical performance data.

Example 18B may include the subject matter of Example 1B to Example 16B or some other example herein, wherein the performance data is real-time performance data.

Example 19B may include the subject matter of Example 1B to Example 18B or some other example herein, wherein the measurement job creation request indicates the performance data to be collected are periodical performance data or real-time performance data.

Example 20B may include the subject matter of Examples 6B, 7B, 14B to 16B, and 17B or some other example herein, wherein reporting the periodical performance data is according to reporting period of the measurement job.

Example 21B may include the subject matter of examples 6B, 7B, 14B to 16B, 17B and 20B or some other example herein, wherein reporting the periodical performance data is by sending the performance data file ready notification.

Example 22B may include the subject matter of examples 6B, 7B, 14B to 16B, and 18B or some other example herein, wherein reporting the real-time performance data is by performance data streaming.

Example 23B may include the subject matter of Examples 1B to 12B or some other example herein, wherein the performance data of NF is number of attempted RRC connection establishments.

Example 24B may include the subject matter of Example 23B or some other example herein, wherein the number of attempted RRC connection establishments is split into sub-counters for each establishment cause and/or subcounters for each NSI.

Example 25B may include the subject matter of Example 23B and 24B or some other example herein, wherein the measurement of number of attempted RRC connection establishments is triggered on receipt of an RRCConnectionRequest message by the gNB from the UE, and each received RRCConnectionRequest message is added to the relevant subcounter for the establishment cause and/or the relevant subcounter for the NSI.

Example 26B may include the subject matter of Examples 1B to 12B or some other example herein, wherein the performance data of NF is number of successful RRC connection establishments.

Example 27B may include the subject matter of Example 26B or some other example herein, wherein the number of successful RRC connection establishments is split into sub-counters for each establishment cause and/or subcounters for each NSI.

Example 28B may include the subject matter of Examples 26B and 27B or some other example herein, wherein the measurement of number of successful RRC connection establishments is triggered on receipt of an RRCConnectionSetupComplete message by the gNB from the UE, and each received RRCConnectionSetupComplete message is added to the relevant subcounter for the establishment cause and/or the relevant subcounter for the NSI.

Example 29B may include the subject matter of Examples 1B to 12B or some other example herein, wherein the performance data of NF is number of failed RRC connection establishments.

Example 30B may include the subject matter of Example 26B or some other example herein, wherein the number of failed RRC connection establishments is split into subcounters for each failure cause.

Example 31B may include the subject matter of Examples 29B and 30B or some other example herein, wherein the measurement of number of failed RRC connection establishments is triggered on transmission of an RRCConnectionReject message by the gNB from the UE, and each transmitted RRCConnectionReject message is added to the relevant subcounter for the failure cause.

Example 32B may include an apparatus comprising means to perform one or more elements of a method described in or related to any of Examples 1B-31B, or any other method or process described herein.

Example 33B may include one or more non-transitory computer-readable media comprising instructions to cause an electronic device, upon execution of the instructions by one or more processors of the electronic device, to perform one or more elements of a method described in or related to any of Examples 1B-31B, or any other method or process described herein.

Example 34B may include an apparatus comprising logic, modules, or circuitry to perform one or more elements of a method described in or related to any of Examples 1B-31B, or any other method or process described herein. Example 35B may include a method, technique, or process as described in or related to any of Examples 1B-31B, or portions or parts thereof.

Example 36B may include an apparatus comprising: one or more processors and one or more computer readable media comprising instructions that, when executed by the one or more processors, cause the one or more processors to perform the method, techniques, or process as described in or related to any of Examples 1B-31B, or portions thereof.

Example 37B may include a signal as described in or related to any of Examples 1B-31B, or portions or parts thereof.

Example 38B may include a signal in a wireless network as shown and described herein. Example 39B may include a method of communicating in a wireless network as shown and described herein.

Example 40B may include a system for providing wireless communication as shown and described herein.

Example 41B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A non-transitory computer-readable storage medium having computer-readable instructions stored thereon, the computer-readable instructions to, when executed, instruct a processor for a service producer in a wireless network to provide performance management related service for one or more network function (NF), the instructions to:
   process a measurement job creation request from an authorized consumer, the measurement job creation request to create a measurement job to collect performance data of the one or more NF; and
   in response to the measurement job creation request, generate a request for the one or more NF to collect the performance data,
   wherein the measurement job creation request indicates whether the performance data is to be reported by performance data file or by performance data streaming.

2. The non-transitory computer-readable storage medium of claim 1, wherein the instructions are further to, in response to creation of the measurement job for the one or more NF, generate the performance data for the measurement job.

3. The non-transitory computer-readable storage medium of claim 1, wherein the service producer is part of a network function management function (NFMF) or part of an NF in the wireless network.

4. The non-transitory computer-readable storage medium of claim 3, wherein the NFMF comprises a network function performance management function (NFPMF).

5. The non-transitory computer-readable storage medium of claim 1, where the service producer comprises an NF measurement job control service producer.

6. The non-transitory computer-readable storage medium of claim 1, wherein the instructions are further to:
   process a query, from the authorized consumer, to report information about one or more ongoing NF measurement job corresponding to the authorized consumer; and
   in response to the query, provide the information about the one or more ongoing NF measurement job to the authorized consumer.

7. An apparatus to perform a network slice subnet instance (NSSI) measurement job control service, the apparatus comprising:
   a memory interface to send or receive, to or from a memory device, performance data of one or more NSSI;
   a processor to:
      process a request to create an NSSI measurement job to collect the performance data of the one or more NSSI;
      decompose the performance data of the one or more NSSI into performance data types of at least one of constituent NSSIs or network functions (NFs);
      determine whether the performance data types of the at least one of constituent NSSIs or NFs can be collected by existing measurement jobs, if any, for the at least one of constituent NSSIs or NFs; and
      in response to a determination that the performance data types cannot be collected by the existing measurement jobs for at least one of constituent NSSIs or NFs, create one or more new measurement jobs for the at least one of constituent NSSIs or NFs, respectively.

8. The apparatus of claim 7, wherein to create the one or more new measurement jobs the processor is further to:
   generate a message to request the respective at least one of constituent NSSIs or NFs to collect the performance data, wherein the message to request indicates whether the performance data is to be reported by performance data file or by performance data streaming.

9. The apparatus of claim 7, wherein the apparatus comprises a service producer configured to provide a performance management service for NSSI.

10. The apparatus of claim 9, wherein the service producer is part of a network slice subnet management function (NSSMF).

11. The apparatus of claim 9, wherein the service producer comprises an NSSI measurement job control service producer.

12. The apparatus of claim 7, wherein the processor is further to:
  process a query, from an authorized consumer, to report information about one or more ongoing NSSI measurement job corresponding to the authorized consumer; and
  in response to the query, provide the information about the one or more ongoing NSSI measurement job to the authorized consumer.

13. The apparatus of claim 7, wherein the processor is further to perform one of:
  send one or more NSSI performance data file ready notification to an authorized consumer; or
  send one or more NSSI performance data stream to the authorized consumer.

14. A non-transitory computer-readable storage medium having computer-readable instructions stored thereon, the computer-readable instructions to, when executed, instruct a processor to provide performance management (PM) service for a network slice instance (NSI), the instructions to:
  process a request, from an authorized consumer, the request to create a network slice instance (NSI) measurement job to collect performance data of one or more NSI, wherein the request indicates whether the performance data is to be reported by performance data file or by performance data streaming;
  decompose the performance data of the one or more NSI into performance data types of at least one of constituent network slice subnet instances (NSSIs) or constituent network functions (NFs); and
  create a new measurement job for at least one of the constituent NSSIs or the constituent NFs.

15. The non-transitory computer-readable storage medium of claim 14, wherein to create the new measurement job the instructions are further to:
  determine whether decomposed performance data of the constituent NSSIs can be collected by existing measurement jobs for NSSIs; and
  in response to a determination that the decomposed performance data of the constituent NSSIs cannot be collected by the existing measurement jobs for NSSIs, create the new measurement job for the constituent NSSIs.

16. The non-transitory computer-readable storage medium of claim 14, wherein to create the new measurement job the instructions are further to:
  determine whether decomposed performance data of the constituent NFs can be collected by existing measurement jobs for NFs; and
  in response to a determination that the decomposed performance data of the constituent NFs cannot be collected by the existing measurement jobs for NFs, request an NF PM service producer to create the new measurement job for the constituent NFs.

17. The non-transitory computer-readable storage medium of claim 14, wherein to process the request the instructions are further to process an NSI measurement job creation request from the authorized consumer.

18. The non-transitory computer-readable storage medium of claim 14, wherein the service producer comprises a network slice management function (NSMF).

19. The non-transitory computer-readable storage medium of claim 14, wherein the service producer comprises an NSI measurement job control service producer.

20. The non-transitory computer-readable storage medium of claim 14, wherein the instructions are further to:
  process a query, from the authorized consumer, to report information about one or more ongoing NSI measurement job corresponding to the authorized consumer; and
  in response to the query, provide the information about the one or more ongoing NSI measurement job to the authorized consumer.

21. The apparatus of claim 14, wherein the instructions are further to:
  if the request to create the NSI measurement job indicates that the performance data is to be reported by the performance data file, send a performance data file ready notification to the authorized consumer; and
  if the request to create the NSI measurement job indicates that the performance data is to be reported by the performance data streaming, send a performance data stream to the authorized consumer.

* * * * *